(12) United States Patent
Obara et al.

(10) Patent No.: US 10,728,424 B2
(45) Date of Patent: Jul. 28, 2020

(54) COLOR MEASURING APPARATUS AND IMAGE FORMING APPARATUS

(71) Applicant: CANON KABUSHIKI KAISHA, Tokyo (JP)

(72) Inventors: Mitsuhiro Obara, Suntou-gun (JP); Kenta Yano, Tokyo (JP); Takeyoshi Saiga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 14/993,600

(22) Filed: Jan. 12, 2016

(65) Prior Publication Data

US 2016/0205287 A1 Jul. 14, 2016

(30) Foreign Application Priority Data

Jan. 13, 2015 (JP) ................................ 2015-003901
Nov. 6, 2015 (JP) ................................ 2015-218057

(51) Int. Cl.
| | | |
|---|---|---|
| *G06F 15/00* | (2006.01) | |
| *H04N 1/60* | (2006.01) | |
| *G03G 15/00* | (2006.01) | |
| *G01J 3/02* | (2006.01) | |
| *G01J 3/52* | (2006.01) | |

(52) U.S. Cl.
CPC .......... *H04N 1/6044* (2013.01); *G01J 3/0205* (2013.01); *G01J 3/0289* (2013.01); *G03G 15/5062* (2013.01); *G01J 3/52* (2013.01)

(58) Field of Classification Search
CPC .... H04N 1/6044; G01J 3/0205; G01J 3/0289; G03G 15/5062

USPC ........................................................ 358/1.9
See application file for complete search history.

(56) References Cited

U.S. PATENT DOCUMENTS

| | | | | |
|---|---|---|---|---|
| 8,437,050 | B2 | 5/2013 | Tochigi et al. | |
| 8,497,892 | B2 * | 7/2013 | Nakaie | B41J 2/45 |
| | | | | 347/224 |
| 2007/0263407 | A1 * | 11/2007 | Sakai | G02B 6/0021 |
| | | | | 362/608 |
| 2008/0273896 | A1 * | 11/2008 | Kinoshita | G03G 15/0409 |
| | | | | 399/151 |
| 2012/0154417 | A1 * | 6/2012 | Ninan | G02B 27/2264 |
| | | | | 345/581 |
| 2012/0271103 | A1 * | 10/2012 | Gono | A61B 1/00163 |
| | | | | 600/109 |

(Continued)

FOREIGN PATENT DOCUMENTS

| | | |
|---|---|---|
| JP | 2008-234962 A | 10/2008 |
| JP | 2010-277070 A | 12/2010 |

(Continued)

*Primary Examiner* — Mark R Milia
(74) *Attorney, Agent, or Firm* — Venable LLP

(57) ABSTRACT

A spectral color measuring apparatus includes a light source, an optical emitting element configured to regulate a position of the light source in an emission direction of a light flux, and to guide the light flux emitted from the light source onto a color-patch image formed on a surface of a sheet, and an urging member configured to urge the light source toward the optical emitting element in the emission direction of the light flux. With this, relative positional accuracy between the light source and the optical emitting member is enhanced, thereby enabling accurate measurement of a color of an image in a short color measuring takt (time period).

18 Claims, 17 Drawing Sheets

(56) References Cited

U.S. PATENT DOCUMENTS

| | | | | |
|---|---|---|---|---|
| 2013/0294108 A1* | 11/2013 | Hu | .................. | G02B 27/30 |
| | | | | 362/613 |
| 2014/0022821 A1* | 1/2014 | Kim | .................. | F21V 15/01 |
| | | | | 362/612 |
| 2014/0029963 A1* | 1/2014 | Nakai | ................ | G01J 1/0488 |
| | | | | 399/39 |

FOREIGN PATENT DOCUMENTS

| | | |
|---|---|---|
| JP | 2012-216435 A | 11/2012 |
| JP | 2012-234718 A | 11/2012 |
| JP | 2013-140188 A | 7/2013 |

\* cited by examiner

COLOR MEASURING APPARATUS AND IMAGE FORMING APPARATUS

BACKGROUND OF THE INVENTION

Field of the Invention

The present invention relates to a color measuring apparatus, and more particularly, to a color measuring apparatus to be mounted in an image forming apparatus.

Description of the Related Art

In image forming apparatus configured to form a color image using an electrophotographic method, a color tone may fluctuate due to problems of instability and reproducibility in color mixture of toners. The color tone may fluctuate not only in the image forming apparatus configured to form the color image using the electrophotographic method but also in image forming apparatus configured to form a color image using an ink jet method and the like.

In the electrophotographic method, particularly depending on a usage environment and a usage frequency, sensitivity of a photosensitive drum, a toner charging amount, and transfer efficiency for a recording material vary for each color. As a result, a color mixture ratio may deviate from a predetermined value, which is liable to adversely affect the color tone. Further, in the printing industry the color tone is required to be reproduced in a higher level.

In order to solve such problems, a small-sized color measuring apparatus to be suitably used in the image forming apparatus is proposed. For example, in Japanese Patent Application Laic-Open No. 2010-277070, a small-sized color measuring apparatus to be suitably used in the color image forming apparatus is proposed.

The color measuring apparatus includes a light source, an optical emitting member configured to guide a light flux passing through the optical emitting member onto a detected object arranged on a detected surface so as to illuminate the detected object, and an optical light guiding member configured to guide the light flux reflected by the detected object onto an optical member.

Further, the optical emitting member is configured to guide the light flux emitted from the light source utilizing refraction at an incident surface and an emitting surface and reflection at a reflection surface. With this, even when a reading position of the detected object fluctuates, fluctuation of the intensity of the light illuminating the detected surface is reduced. In this manner, the optical emitting member with high illumination efficiency is realized.

In the color measuring apparatus described in Japanese Patent Application Laid-Open No. 2010-277070, the optical emitting member and the light source are fixed on an electronic substrate. However, how to position the optical emitting member and the light source is not described. The accuracy of mounting a general electrical component is lower than the accuracy of mounting an optical component. Therefore, only fixing the optical emitting member and the light source, on the electronic substrate is not enough for sufficiently ensuring the accuracy of the relative position between the light source and the optical emitting member, which may degrade the performance of the color measuring apparatus.

When the accuracy of the relative position between the light source and the optical emitting member is degraded, the efficiency of taking in the light flux at the incident surface of the optical emitting member is degraded. As a result, the intensity of the illumination light illuminating the detected surface is degraded.

SUMMARY OF THE INVENTION

An object of the present invention is to attain suppression of degradation of accuracy of a relative position between a light source and an optical emitting member.

Another object of the present invention is to provide a color measuring apparatus including a light source an electronic substrate on which the light source is mounted, an optical emitting member configured to guide a light flux emitted from the light source onto a detected surface, an optical light guiding member configured to guide a reflection light reflected by the detected surface, an optical spectral member configured to disperse the light flux exiting from the optical light guiding member to enter the optical spectral member, a light receiving element configured to receive the light flux dispersed by the optical spectral member, a housing configured to accommodate the optical emitting member, the optical light guiding member, and the optical spectral member, and an urging member configured to urge the light source toward the optical emitting member in an emission direction of the light flux, wherein the light source is configured to be urged by the urging member to be brought into contact with the optical emitting member so that the light source is positioned in the emission direction.

A further object of the present invention is to provide an image forming apparatus including a color measuring apparatus including a light source, an electronic substrate on which the light source is mounted, an optical emitting member configured to guide a light flux emitted from the light source onto a detected surface, an optical light guiding member configured to guide a reflection light reflected by the detected surface, an optical spectral member configured to disperse the light flux exiting from the optical light guiding member to enter the optical spectral member, a light receiving element configured to receive and detect the light flux dispersed by the optical spectral member, a housing configured to accommodate the optical emitting member, the optical light guiding member, and the optical spectral member, and an urging member configured to urge the light source toward the optical emitting member in an emission direction of the light flux, and an image forming portion configured to form an image on a recording material, wherein the image forming apparatus is configured to measure, by the color measuring apparatus, a color of an image formed on the recording material by the image forming portion as the detected surface, wherein the light source is configured to be urged by the urging member to be brought into contact with the optical emitting member so that the light source is positioned in the emission direction.

A further object of the present invention is to provide a color measuring apparatus, including a light source, an electronic substrate on which the light source is mounted, an optical emitting member configured to guide a light flux emitted from the light source onto a detected surface, and a light receiving element configured to receive the light flux reflected by the detected surface, wherein the light source is configured to be urged by the electronic substrate to be brought into contact with the optical emitting member so that the light source is positioned in an emission direction of the light flux.

A still further object of the present invention to provide an image forming apparatus, including a color measuring apparatus including a light source, an electronic substrate on which the light source is mounted, an optical emitting member configured to guide a light flux emitted from the light source onto a detected surface, and a light receiving element configured to receive the light flux reflected by the detected surface, and an image forming portion configured to form an image on a recording material, wherein the image forming apparatus is configured to measure, by the color measuring apparatus, a color of an image formed on the recording material by the image forming portion as the detected surface, wherein the light source is configured to be urged by the electronic substrate to be brought into contact with the optical emitting member so that the light source is positioned in an emission direction of the light flux.

Further features of the present invention will become apparent from the following description of exemplary embodiments with reference to the attached drawings.

DESCRIPTION OF THE EMBODIMENTS

Figure 1:
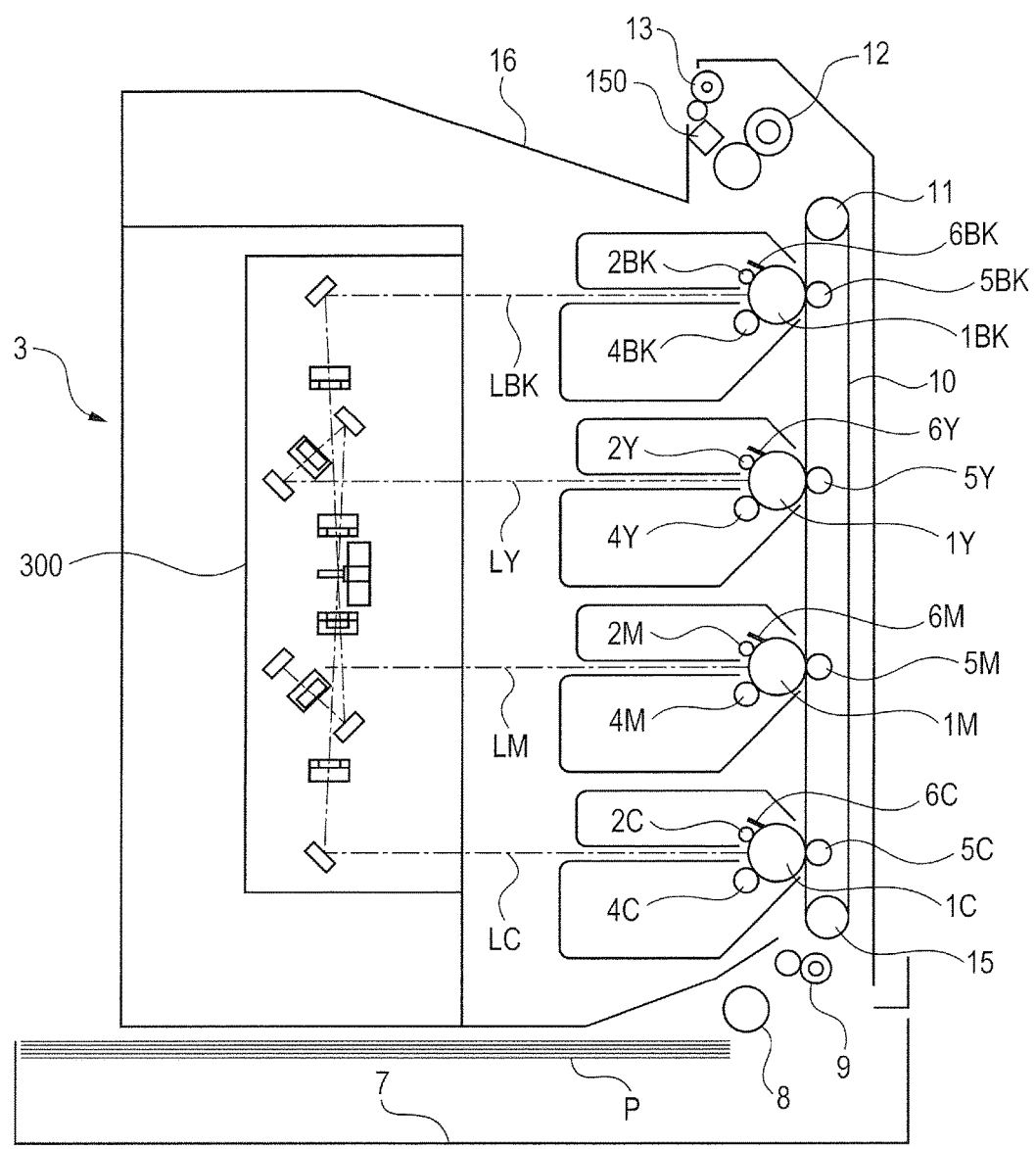
FIG. 1 is an explanatory sectional view for illustrating a configuration of an image forming apparatus having a spectral color measuring apparatus mounted therein according to the present invention.

An image forming apparatus including a spectral color measuring apparatus according to an embodiment of the present invention is described in detail referring to the drawings.

First Embodiment

First, referring to FIG. 1 to FIG. 6B, a configuration of an image forming apparatus including a spectral color measuring apparatus according to a first embodiment of the present invention is described.

<Image Forming Apparatus>

First, referring to FIG. 1, a configuration of a color image forming apparatus (hereinafter simply referred to as "image forming apparatus") 3 including a spectral color measuring apparatus 150 according to the present invention is described. FIG. 1 is an explanatory sectional view for illustrating the configuration of the image forming apparatus 3 of this embodiment. In FIG. 1, the spectral color measuring apparatus 150 is arranged between a fixing device 12 serving as a fixing unit and delivery rollers 13. Photosensitive drums 1C, 1M, 1Y, and 1BK serving as image bearing members are arranged at equal intervals. Note that, for the sake of convenience of description, the photosensitive drums 1C, 1M, 1Y, and 1BK may be hereinafter simply and representatively referred to as the photosensitive drum 1. The same holds true for other image forming process units.

<Image Forming Units>

Next, a configuration of image forming units configured to form a toner image (image) on a sheet P serving as a recording material is described. Surfaces of the respective photosensitive drums 1 are uniformly charged by chargers 2C, 2M, 2Y, and 2BK serving as charging units. Laser beams LC, LM, LY, and LBK corresponding to respective colors, which are optically modulated based on image information, are emitted from an optical scanning apparatus 300 serving as an image exposure unit to be radiated onto the uniformly charged surfaces of the photosensitive drums 1. In this manner, latent images are formed on the corresponding surfaces of the photosensitive drums 1.

Developers (toners) of respective colors of cyan C, magenta M, yellow Y, and black BK are supplied to the latent images formed on the surfaces of the respective photosensitive drums 1 by developing devices 4C, 4M, 4Y, and 4BK serving as developing units. In this manner, the latent images are visualized as toner images (images) of the respective colors of cyan C, magenta M, yellow Y, and black BK.

On the other hand, the sheets P serving as the recording materials are stacked on an intermediate plate (not shown) of a feed tray 7, which is capable of being raised and lowered. The sheets P are sequentially fed one by one by a feed roller 8 and a separation unit (not shown). Then, the sheet P is fed onto an outer peripheral surface of a conveyance belt 10 by registration rollers 9 in synchronization with a timing at which the toner images start to be written on the surfaces of the respective photosensitive drums 1.

The conveyance belt 10 is stretched around a driving roller 11 and a tension roller 15. The driving roller 11 is configured to convey and rotate the conveyance belt 10 accurately with a rotational driving force transmitted from a drive motor (not shown) configured to rotate less irregularly.

The toner images of the respective colors of cyan C, magenta M, yellow Y, and black BK, which are formed on the surfaces of the respective photosensitive drums 1, are transferred onto a surface of the sheet P as follows. The sheet P is attracted onto the outer peripheral surface of the conveyance belt 10 by an attraction unit (not shown) so that the sheet P is accurately conveyed. Due to actions of transfer rollers 5C, 5M, 5Y, and 5BK serving as transfer units, the toner images, which are formed on the surfaces of the respective photosensitive drums 1, are electrostatically transferred onto the surface of the sheet P sequentially. In this manner, a color image is formed on the surface of the sheet P.

After the toner images of the respective colors are transferred onto the surface of the sheet P, residual toners remaining on the surfaces of the respective photosensitive drums 1 are removed by cleaners 6C, 6M, 6Y, and 6BK serving as cleaning units. Then, the surfaces of the respective photosensitive drums 1 are again uniformly charged by the respective chargers 2 in order to form a subsequent color image.

The color image formed on the surface of the sheet P is fixed thereonto while being heated and pressurized by the fixing device 12 serving as the fixing unit. Then, a color of the color image formed on the surface of the sheet P (on the recording material) is measured by the spectral color measuring apparatus 150 with the color image serving as a detected surface. After that, the sheet P is delivered by the delivery rollers 13 onto a delivery tray 16 provided outside a main body of the image forming apparatus 3.

<Spectral Color Measuring Apparatus>

As illustrated in FIG. 1, the spectral color measuring apparatus 150 is arranged on a conveyance path at an immediately downstream side with respect to the fixing device 12. Then, illumination light is radiated by the spectral color measuring apparatus 150 onto an image surface having a color-patch image 210 serving as a detected surface fixed thereon, which is formed on the surface of the sheet P.

The spectral color measuring apparatus 150 is configured to detect chromaticity of each color-patch image 210 fixed on the surface of the sheet P delivered by the fixing device 12. A color of the color-patch image 210 on the surface of the sheet P after the toner image is fixed on the surface by the fixing device 12 is measured in order to perform color matching in consideration of chromaticity change that may be caused due to a difference in type of the sheets P and fixing condition.

A detection result of measuring the color by the spectral color measuring apparatus 150 is transferred to a printer controller (not shown) serving as a control unit. The printer controller is configured to determine whether or not color reproducibility of the color-patch image 210 fixed on the surface of the sheet P delivered by the fixing device 12 is proper.

A color difference between chromaticity designated by the printer controller and the color-patch image 210 of a single color or a mixed color, which is fixed on the surface of the sheet P delivered by the fixing device 12, may fail within a predetermined range. In such a case, the printer controller finishes color calibration (tint adjustment).

On the other hand, the color difference between the chromaticity designated by the printer controller and the color-patch image 210 fixed on the surface of the sheet P delivered by the fixing device 12 may fall out of the predetermined range. In such a case, the printer controller executes the color calibration until the color difference falls within the predetermined color difference based on color difference information obtained by measuring the color by the spectral color measuring apparatus 150.

The chromaticity may differ for each color image formed on the surface of the sheet P depending on individual difference for each image forming apparatus 3, a type of the sheet P, a usage environment, a usage frequency, and the like. Even in such a case, the spectral color measuring apparatus 150 is mounted in the image forming apparatus 3, thereby being capable of correcting the chromaticity of the color image to the absolute chromaticity even when any condition difference is present. Therefore, stable chromaticity can be reproduced reliably to attain advanced color calibration.

Figure 17:
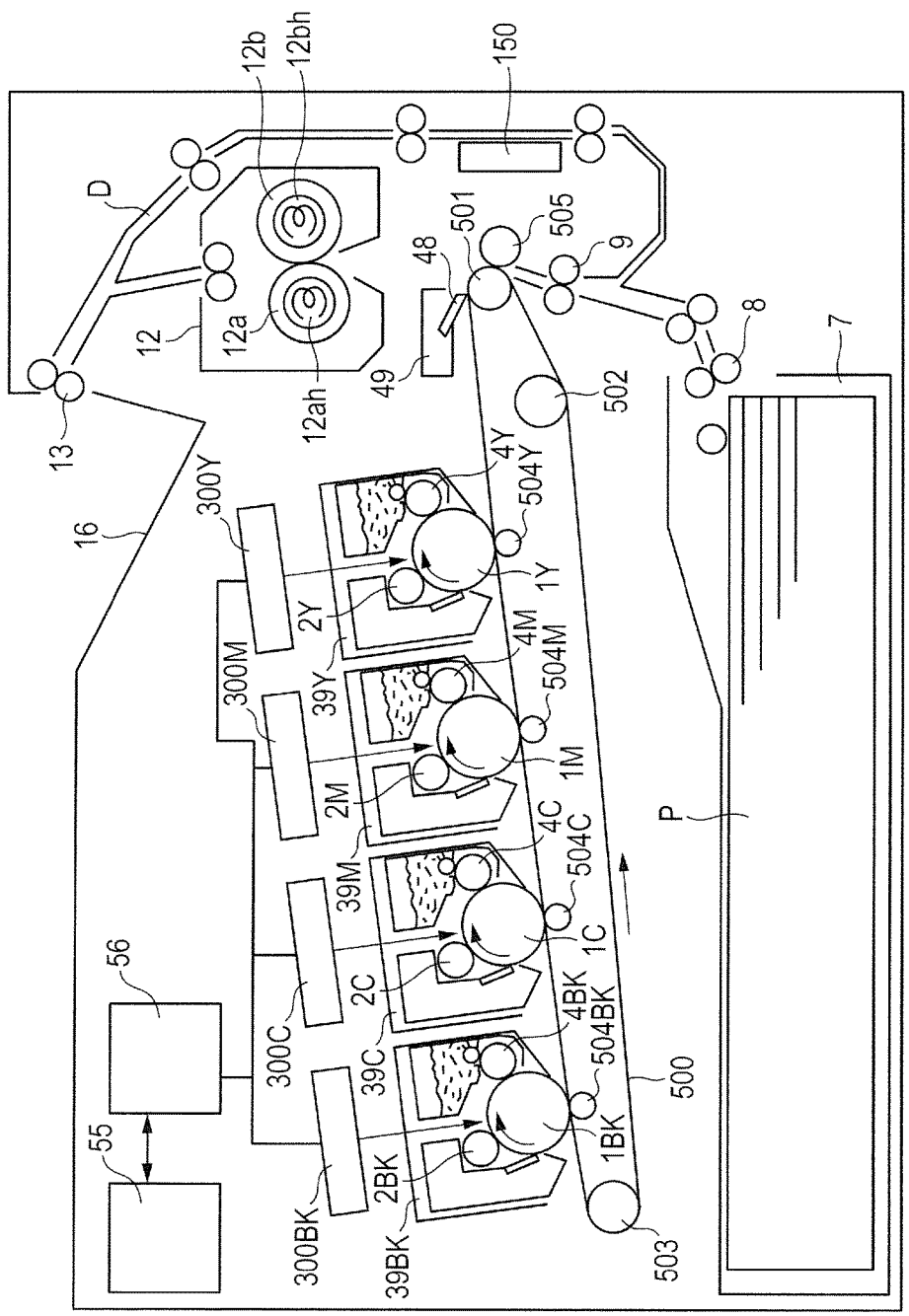
FIG. 17 is an explanatory sectional view for illustrating a configuration of an image forming apparatus having the spectral color measuring apparatus according to the present invention mounted therein.

Note that, in FIG. 1, the image forming apparatus using the conveyance belt 10 is described, but the image forming apparatus is not limited thereto. For example, the spectral color measuring apparatus 150 may be mounted in a tandem-type image forming apparatus employing an intermediate transfer belt. FIG. 17 is a sectional view for illustrating a schematic configuration of the tandem-type image forming apparatus having the spectral color measuring apparatus 150 mounted therein. Referring to FIG. 17, an operation of image forming portions of the tandem-type image forming apparatus is described. Here, configurations and operations of the individual image forming portions (image forming units) are substantially the same except that different colors of toner (yellow (Y), magenta (M), cyan (C), and black (BK)) are used. Therefore, in the following description, unless specific distinctions are necessary, the suffixes Y, M, C, and BK each added to reference symbols of the components in FIG. 17 so as to indicate corresponding colors are omitted, and the components are collectively described.

The image forming apparatus in FIG. 17 includes the feed tray 7. The image forming portions in FIG. 17 each include, for a station of each color, the photosensitive drum 1, the charger 2, the optical scanning apparatus 300, and the developing device 4. The image forming apparatus further includes an intermediate transfer belt 500, a driving roller 501 configured to drive the intermediate transfer belt, a tension roller 503, an auxiliary roller 502, primary transfer rollers 504, a secondary transfer roller 505, the fixing device 12, and a control portion 55 and a controller portion 56 configured to control an image forming operation of the image forming portions.

The photosensitive drum 1 is formed by applying an organic photoconductive layer around an outer periphery of an aluminum cylinder, and is configured to be rotated by a driving force transmitted from a drive motor (not shown). The drive motor is configured to rotate the photosensitive drum 1 in a clockwise direction in FIG. 17 in accordance with the image forming operation.

When the above-mentioned control portion 55 receives an image signal, (input signal), the sheet P is fed by the feed rollers 8 from the feed tray 7 into the image forming apparatus. Then, the sheet P is temporarily nipped by the registration rollers 9 for synchronization between the image forming operation and conveyance of the sheet P as described later, and the sheet P is stopped to wait.

On the other hand, the controller portion 56 causes the optical scanning apparatus 300 to form an electrostatic latent image in response to the received image signal on the surface of the photosensitive drum 1 charged at a predetermined potential due to an action of the charger 2. The developing device 4 is a unit configured to visualize the electrostatic latent image, and is configured to develop an image of yellow (Y), magenta (M), cyan (C), or black (BK) for each station. In this manner, the electrostatic latent image formed on the surface of each photosensitive drum 1 is developed as a single color toner image due to an action of each developing device. The photosensitive drum 1, the charger 2, and the developing device 4 for each color construct an integral structure as a toner cartridge 39 removably mounted in a main body of the image forming apparatus.

The intermediate transfer belt 500 is held in contact with each photosensitive arum 1, and is configured to rotate in synchronization with rotation of each photosensitive drum 1 in a counterclockwise direction in FIG. 17 when a color image is formed. The developed single color toner images are sequentially transferred (primarily transferred) due to an action of a primary transfer bias applied to each primary transfer roller 504, to thereby form a multicolor toner image on the intermediate transfer belt 500. Then, the multicolor toner image formed on the intermediate transfer belt 500 is conveyed to a secondary transfer portion (nip portion) formed by the driving roller 501 and the secondary transfer roller 505. At the same time, the sheet P waiting in the state of being nipped by the registration rollers 9 is conveyed to the secondary transfer portion due to an action of the registration rollers 9 in synchronization with the multicolor toner image on the intermediate transfer belt 500. Then, the multicolor toner image on the intermediate transfer belt 500 is collectively transferred (secondarily transferred) onto the sheet P due to an action of a secondary transfer bias applied to the secondary transfer roller 505.

The fixing device 12, is configured to melt and fix the transferred multicolor toner image while conveying the sheet P. The fixing device 12 includes a fixing roller 12a configured to heat the sheet P, and a pressure roller 12b configured to bring the sheet P into press-contact with the fixing roller 12a. The fixing roller 12a and the pressure roller 12b are each formed into a hollow shape, and heaters 12ah and 12bh are respectively mounted therein. The sheet P bearing the multicolor toner image is conveyed by the fixing roller 12a and the pressure roller 12b, and the sheet P is heated and pressurized so that the toner is fixed onto the surface of the sheet P.

The sheet P having the toner image fixed thereon is delivered to the delivery tray 16 by the delivery rollers 13 so that the image forming operation is finished. Alternatively, when image formation on a second side of the sheet P is performed, the sheet P is switched back (conveyed backward) in a delivery portion. When the image formation on the second side is performed, the sheet P bearing the multicolor toner image on the first side (on one side) passes through a duplex conveyance path D through the switch back operation in the delivery portion, and is temporarily nipped by the registration rollers 9 again to stop and wait. Then, the above-mentioned sequential image forming operation is performed, to thereby form an image on the second side of the sheet P. A cleaning unit 48 is configured to remove toner remaining on the intermediate transfer belt 500

(transfer residual toner), and the transfer residual toner collected by the cleaning unit 48 is stored, in a cleaner container 49 as waste toner.

The spectral color measuring apparatus 150 of this embodiment, is arranged in a center position of the duplex conveyance path in a longitudinal direction in order to measure a color of a toner patch (color-measurement patch) formed on the sheet P as a color-measured material. The longitudinal direction herein refers to a direction orthogonal to a conveyance direction in an image formation surface of the sheet P conveyed through the duplex conveyance path (rotation axis direction of the photosensitive drum 1). In the image forming apparatus of this embodiment, the control portion 55 arranged in the image forming apparatus is configured to adjust image formation conditions of each image forming portion based on a color measurement result of the spectral color measuring apparatus 150. The adjustment of image formation conditions refers to correction of image data, and adjustment of an exposure light amount, a developing bias, the transfer bias, and the like.

Figure 2:
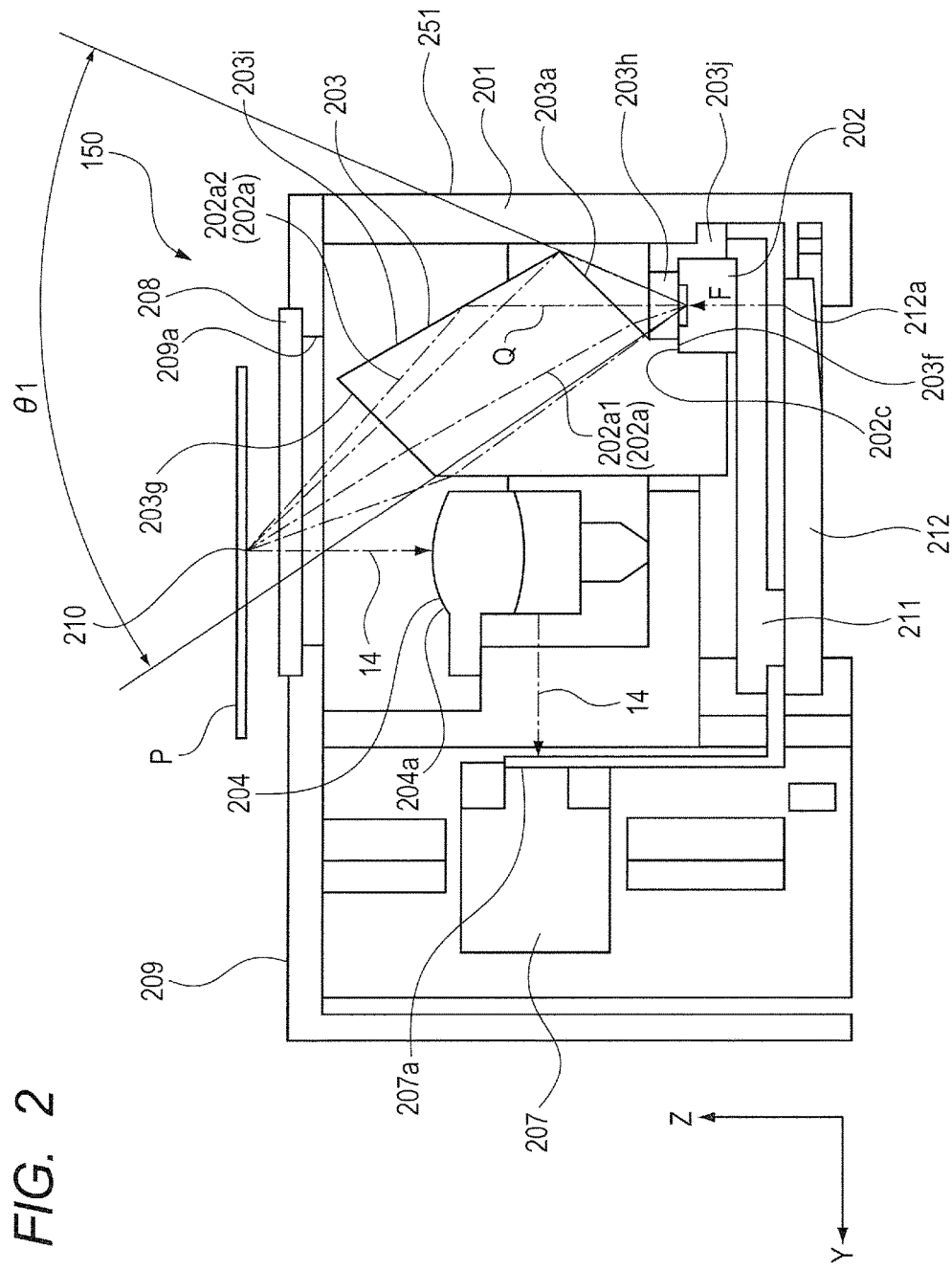
FIG. 2 is an explanatory sectional view for illustrating a configuration of the spectral color measuring apparatus according to a first embodiment of the present invention.

Next, referring to FIG. 2 to FIG. 6B, a configuration of the spectral color measuring apparatus 150 is described. FIG. 2 is an explanatory sectional view for illustrating a peripheral configuration of an optical emitting element 203 serving as an optical emitting member arranged in the spectral color measuring apparatus 150. FIG. 3A is an explanatory perspective view for illustrating the configuration of the spectral color measuring apparatus 150 under a state in which a cover 209 formed of a light shielding member illustrated in FIG. 3B is removed. FIG. 3B is a perspective view for illustrating an external appearance of the spectral color measuring apparatus 150.

As illustrated in FIG. 2, the spectral color measuring apparatus 150 includes a light source 202 in a housing 201 formed of a light shielding member. The spectral color measuring apparatus 150 further includes, in the housing 201, the optical emitting element 203 configured to guide a light flux 202a emitted from the light source 202 onto the color-patch image 210 serving as the detected surface, which is fixed on the surface of the sheet P (onto the detected surface).

Figure 3A:
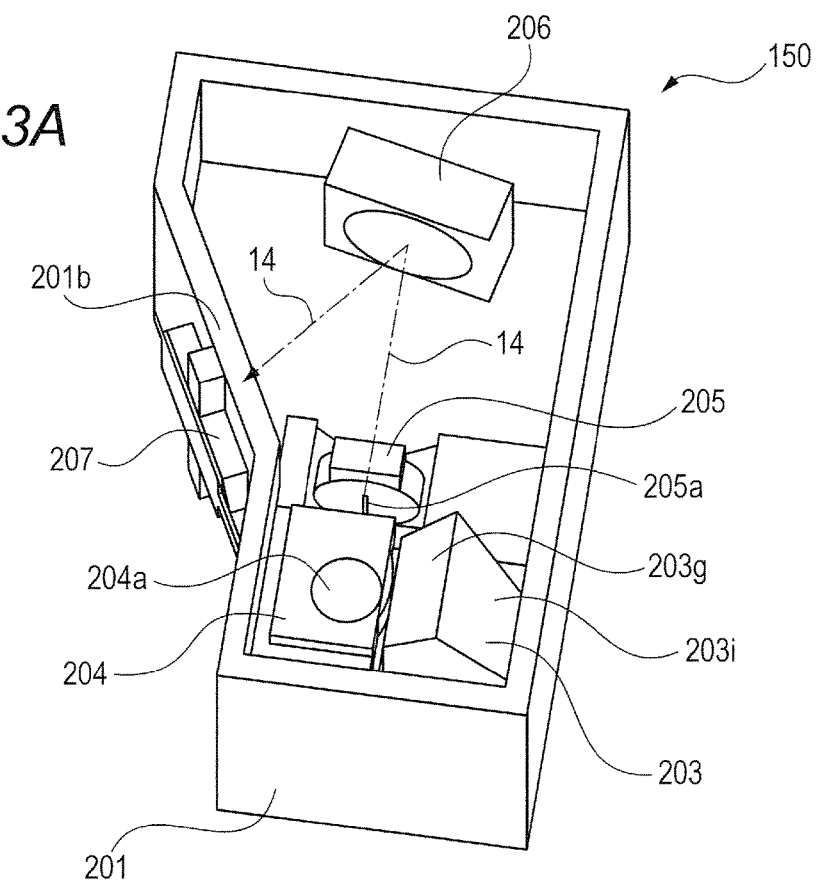
FIG. 3A is a perspective view for illustrating a configuration of the spectral color measuring apparatus under a state in which a cover is removed according to the first embodiment of the present invention.

The spectral color measuring apparatus 150 further includes, in the housing 201, an optical light guiding element 204 serving as an optical light guiding member configured to guide a detected light flux 14 serving as reflection light reflected by the color-patch image 210 serving as the detected surface, and a slit member 205 having a slit 205a formed therein, which is illustrated in FIG. 3A. The spectral color measuring apparatus 150 further includes, in the housing 201, an optical spectral member 206 configured to disperse the detected light flux 14 serving as the light flux exiting from the optical light guiding element 204 to enter the optical spectral member 206.

The optical emitting element 203, the optical light guiding element 204, and the optical spectral member 206 of this embodiment are positioned with respect to the housing 201 under a state in which each component is held in contact with a positioning portion formed inside the housing 201 so as to be fixed in this state. As illustrated in FIG. 3A, a light receiving element 207, which is configured to receive and detect the detected light flux 14 serving as the light flux dispersed by the optical spectral member 206, is positioned in contact with an outer side of a side plate 201b of the housing 201 so as to be fixed.

Figure 6A:
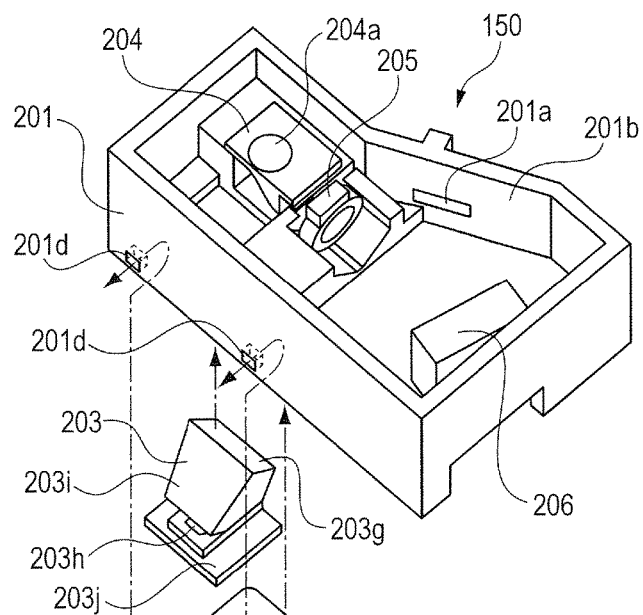
FIG. 6A is an exploded perspective view for illustrating how the optical emitting member, the light source, and an urging unit of the spectral color measuring apparatus are assembled to a housing according to the first embodiment of the present invention.

An opening window 201a being a through hole illustrated in FIG. 6A is formed in the side plate 201b of the housing 201. A light receiving surface 207a of the light receiving element 207 is received in the opening window 201a. A position of the light receiving element 207 is adjustable along the side plate 201b of the housing 201.

Figure 3B:
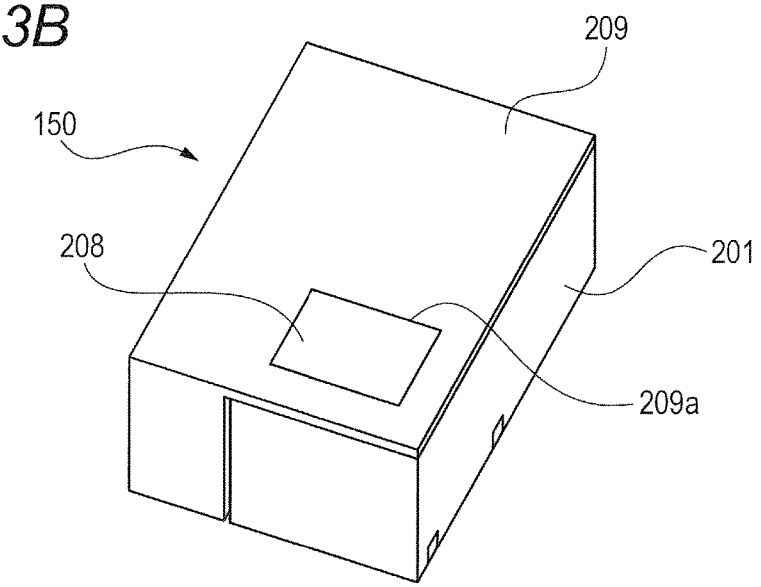
FIG. 3B is a perspective view for illustrating a configuration of the spectral color measuring apparatus under a state in which the cover is mounted according to the first embodiment of the present invention.

As illustrated in FIG. 3B, the cover 209 formed of the light shielding member, which is configured to cover an opening side of the housing 201, is assembled to the spectral color measuring apparatus 150. An opening window 209a being a through hole is formed in the cover 209 at a position opposed to an emitting surface 203g of the optical emitting element 203 and an anamorphic surface 204a of the optical light guiding element 204. A transparent cover glass 208 is mounted on the opening window 209a.

In general, the light source 202 is formed by a light emitting diode (LED) called a surface-mounted type (top view type). The light source 202 is mounted on an electronic substrate 211 formed of a light shielding member. The light distribution angle of the LED of the light source 202 has a characteristic in that the light intensity becomes the highest in a direction of a plane normal line Q of the emitting surface 202b of the light source 202, and the light intensity is gradually reduced along with the increase of the angle of inclination from the plane normal line Q. Therefore, the light flux 202a having the maximum intensity enters an incident surface 203a of the optical emitting element 203 located immediately above the plane normal line Q of the emitting surface 202b of the light source 202.

The optical emitting element 203 of this embodiment is formed of an acrylic resin. The optical emitting element 203 includes the incident surface 203a configured to refract the entering light flux 202a emitted from the light source 202. The optical emitting element 203 further includes a total reflection surface 203i configured to totally reflect the light flux 202a entering the optical emitting element 203 from the incident surface 203a. The optical emitting element 203 further includes an emitting surface 203g configured to refract and emit the light flux 202a entering the optical emitting element 203 from the incident surface 203a, specifically, a transmission light beam 202a1 directly passing through the optical emitting element 203 and a reflection light beam 202a2 totally reflected by the total reflection surface 203i.

As illustrated in FIG. 2, the incident surface 203a of the optical emitting element 203 takes in the light flux 202a having a radiation angle θ1, which is radiated from the light source 202. Then, the light flux 202a including the transmission light beam 202a1, which enters the optical emitting element 203 from the incident surface 203a to be refracted and directly passes through the optical emitting element 203, and the reflection light beam 202a2 totally reflected by the total reflection surface 203i is refracted and emitted from the emitting surface 203g. After that, the light flux 202a is radiated as illumination light onto the color-patch image 210 on the sheet P, which serves as the detected surface.

In order to accurately secure the illumination light for the color-patch image 210, accuracy of positioning the optical emitting element 203 with respect to the housing 201 and accuracy of positioning the light source 202 with respect to the optical emitting element 203 become important factors. The detected light flux 14 serving as the reflection light reflected by the color-patch image 210, which is illustrated in FIG. 2, is guided through the optical light guiding element 204 onto the slit 205a of the slit member 205 illustrated in FIG. 3A.

The optical light guiding element 204 is also formed of an acrylic resin. The optical light guiding element 204 includes the anamorphic surface 204a having a function of converging light in a direction parallel to a light-dispersing direction.

The optical light guiding element 204 further has a function of deflecting the detected light flux 14 in a direction parallel to the color-patch image 210 serving as the detected surface. With this, the detected light flux 14 is imaged into a substantially linear image on the slit 205a of the slit-member 205.

The detected light flux 14 passing through the slit 205a of the slit member 205 is dispersed by the optical spectral member 206 being a diffraction grating of a recessed-surface reflection type. After that, a slit image is imaged on the light receiving element 207 for each wavelength. The optical spectral member 206 is formed by vapor-depositing a reflection surface formed of aluminum or the like and an enhanced reflection surface formed of $SiO_2$ or the like on an optical element formed of a resin by injection molding.

The light receiving element 207 configured to receive the detected light flux 14 dispersed by the optical spectral member 206 is formed by arranging a plurality of photoelectric conversion elements such as silicon (Si) photodiodes in an array in the light-dispersing direction. Each of the elements arranged in an array on the light receiving element 207 is hereinafter referred to as a pixel.

The dispersed slit image is converged on each of the pixels arranged in an array on the light receiving element 207. A signal detected by each pixel is subjected to signal processing by correcting spectral characteristics of the light source 202, spectral sensitivity characteristics of the light receiving element 207, and the like, to thereby calculate a color tone of the detected light flux 14.

Figure 6B:
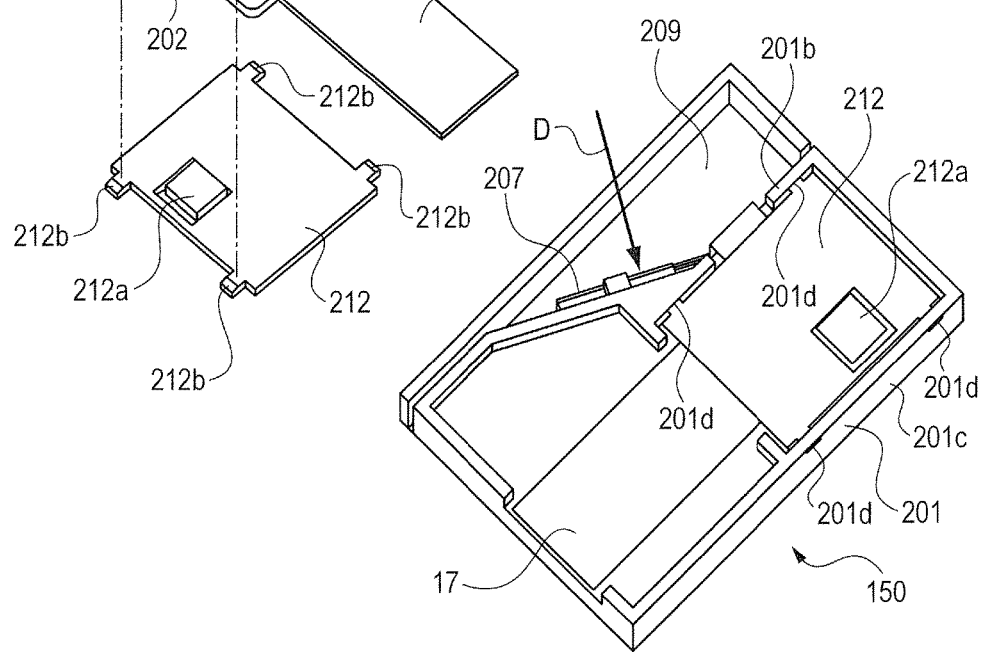
FIG. 6B is a perspective view of the spectral color measuring apparatus having mounted therein the urging unit, which is configured to urge the light source toward the optical emitting member in an emission direction of a light flux, when viewed from a bottom surface side thereof according to the first embodiment of the present invention.

An ambient light D entering the light receiving element 207 from the outside becomes noise to degrade intrinsic color measurement accuracy for the detected light flux 14. Therefore, the light receiving element 207 is fixed in contact with the side plate 201b of the housing 201 under a state in which the light receiving surface 207a is received in the opening window 201a formed through the side plate 201b of the housing 201 illustrated in FIG. 6A. As a result, as illustrated in FIG. 6B, the ambient light D entering the light receiving element 207 from the outside is less liable to be received.

As illustrated in FIG. 2 and FIG. 3B, the opening window 209a being the through hole is formed in a part of the cover 209. The transparent cover glass 208 is mounted on the opening window 209a. Through the opening window 209a, an optical path of the light flux 202a radiated from the emitting surface 203g of the optical emitting element 203 onto the color-patch image 210 is secured. Further, an optical path for guiding the detected light flux 14, which is obtained by reflecting the light flux 202a by the color-patch image 210, onto the anamorphic surface 204a of the optical light guiding element 204 is secured. With the cover glass 208, entry of dust or paper dust from the opening window 209a into the housing 201 is prevented.

<Positioning of Light Source and Optical Emitting Elements>

Figure 4A:
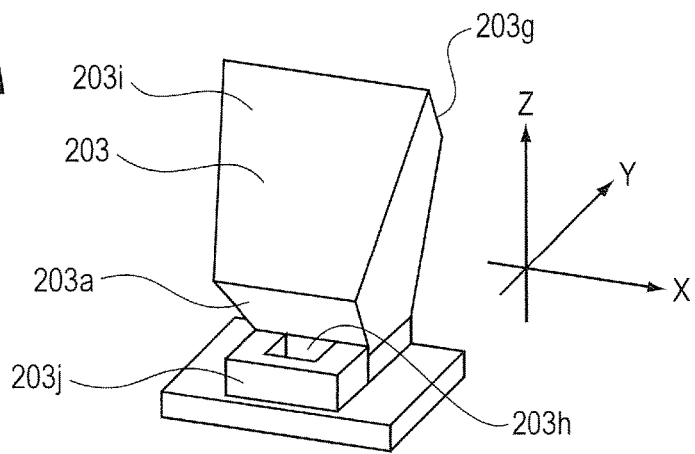
FIG. 4A is a perspective view for illustrating a configuration of an optical emitting member according to the first embodiment of the present invention.
Figure 4B:
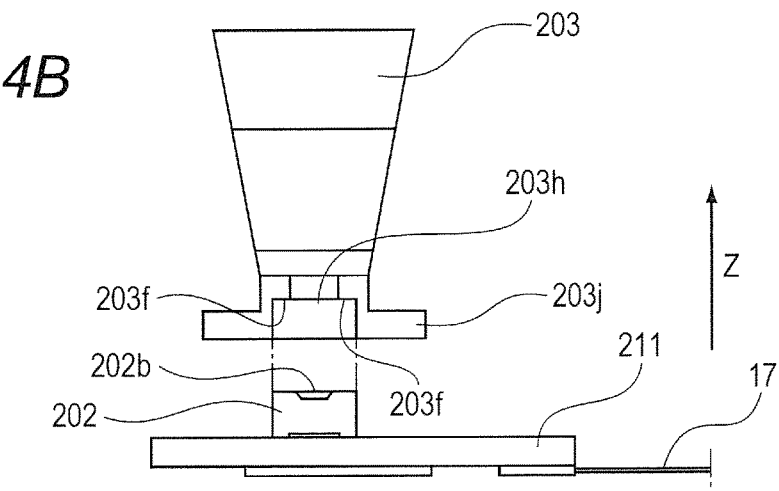
FIG. 4B is an exploded sectional view for illustrating how a light source and the optical emitting member are assembled to each other according to the first embodiment of the present invention.
Figure 4C:
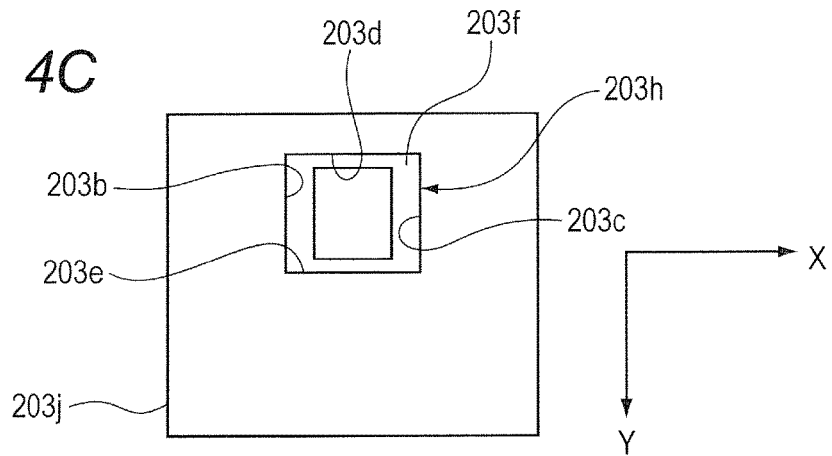
FIG. 4C is a bottom view for illustrating a configuration of regulating portions being wall surfaces of a positioning hole formed in a bottom surface of the optical emitting member according to the first embodiment of the present invention.

Next, a configuration of positioning the light source 202 and the optical emitting element 203, which is a technical feature of this embodiment, is described. As illustrated in FIG. 4A to FIG. 4C, a holder portion 203j of the optical emitting element 203 has a rectangular positioning hole 203h for inserting and fitting the rectangular light source 202 so as to be mounted therein. The light source 202 is formed by injection molding to have a rectangular outer shape.

To assemble the light source 202 and the optical emitting element 203 to each other, as illustrated in FIG. 4B, the light source 202 having substantially the same outer shape as the positioning hole 203h is inserted and fitted into the rectangular positioning hole 203h formed in the holder portion 203j of the optical emitting element 203.

As illustrated in FIG. 4B and FIG. 4C, wall surfaces of the rectangular positioning hole 203h corresponding to the rectangular outer shape of the light source 202 respectively serve as regulating portions 203b to 203f. Then, the light source 202 is inserted and fitted into the positioning hole 203h up to a point where outer peripheral surfaces of the light source 202 having the rectangular outer shape are respectively brought into contact with the regulating portions 203b to 203f being the wall surfaces of the positioning hole 203h. In this manner, the light source 202 is mounted in the positioning hole 203h.

With this, the position of the light source 202 with respect to the optical emitting element 203 is regulated in an emission direction of the light flux 202a emitted from the emitting surface 202b of the light source 202 (arrow Z direction). Further, the position of the light source 202 with respect to the optical emitting element 203 is regulated in four directions orthogonal to the emission direction (arrow Z direction) (arrow X and Y directions and directions opposite thereto).

With the regulating portions 203b to 203f being the wall surfaces of the positioning hole 203h formed in the holder portion 203j of the optical emitting element 203, the light source 202 and the optical emitting element 203 can be positioned at highly accurate relative positions. As a result, the light flux 202a emitted from the emitting surface 202b of the light source 202 is taken in from the incident surface 203a of the optical emitting element 203, and the light flux 202a emitted from the emitting surface 203g is accurately radiated onto a desired position of the color-patch image 210.

<Regulating Portions>

Next, referring to FIG. 4A, FIG. 4B, and FIG. 4C, a configuration of the regulating portions 203b to 203f being the wall surfaces of the positioning hole 203h formed in the optical emitting element 203 is described. FIG. 4C is a bottom view of the optical emitting element 203 when viewed from a lower surface side thereof. As illustrated in FIG. 4C, the positioning hole 203h includes the regulating portions 203b and 203c being the wall surfaces, which are configured to regulate the movement of the light source 202 in the arrow X direction illustrated in FIG. 4C and the direction opposite thereto.

The positioning hole 203h further includes the regulating portions 203d and 203e being the wall surfaces, which are configured to regulate the movement of the light source 202 in the arrow Y direction illustrated in FIG. 4C and the direction opposite thereto. The positioning hole 203h further includes the regulating portion 203f being the wall surface, which is configured to regulate the movement of the light source 202 in the arrow Z direction illustrated in FIG. 4B.

The light source 202 having the rectangular outer shape, which is inserted and fitted into the rectangular positioning hole 203h formed in the holder portion 203j of the optical emitting element 203, has the following configuration. The light source 202 is positioned with respect to the optical emitting element 203 by the regulating portions 203b to 203f being the wall surfaces of the positioning hole 203h, which are illustrated in FIG. 4B and FIG. 4C.

In this embodiment, the dimensions of the positioning hole 203h in the arrow X and Y directions illustrated in FIG. 4C are set correspondingly to the dimensions of the outer shape of the light source 202. With this, the outer peripheral surfaces of the light source 202 in the four directions are respectively held in contact with and fitted to the wall surfaces of the positioning hole 203h in the four directions including the arrow X and Y directions illustrated in FIG. 4C and the directions opposite thereto.

When the dimensions of the outer shape of the light source 202 fluctuate so that the dimensions of the outer shape of the light source 202 become larger than the dimensions of the positioning hole 203h, the light source 202 is to be fastened to the optical emitting element 203 through interference fitting, and hence stress is applied to the light source 202. In order to prevent such a situation, the dimensions of the positioning hole 203h and the dimensions of the outer shape of the light source 202 may be set with a minute allowance.

In this embodiment, only one side (upper surface in FIG. 4B) of the light source 202 is regulated in the arrow 2 direction illustrated in FIG. 4B by the regulating portion 203f being the wall surface of the positioning hole 203h. With this, the position of the light source 202 is regulated by the optical emitting element 203 in the emission direction of the light flux 202a. However, only with the regulating portion 203f being the wall surface of the positioning hole 203h of the optical emitting element 203, the light source 202 can be regulated only at one side in the arrow Z direction illustrated in FIG. 4B (in an upward direction in FIG. 4B).

<Positioning Failure of Light Source>

Figure 5A:
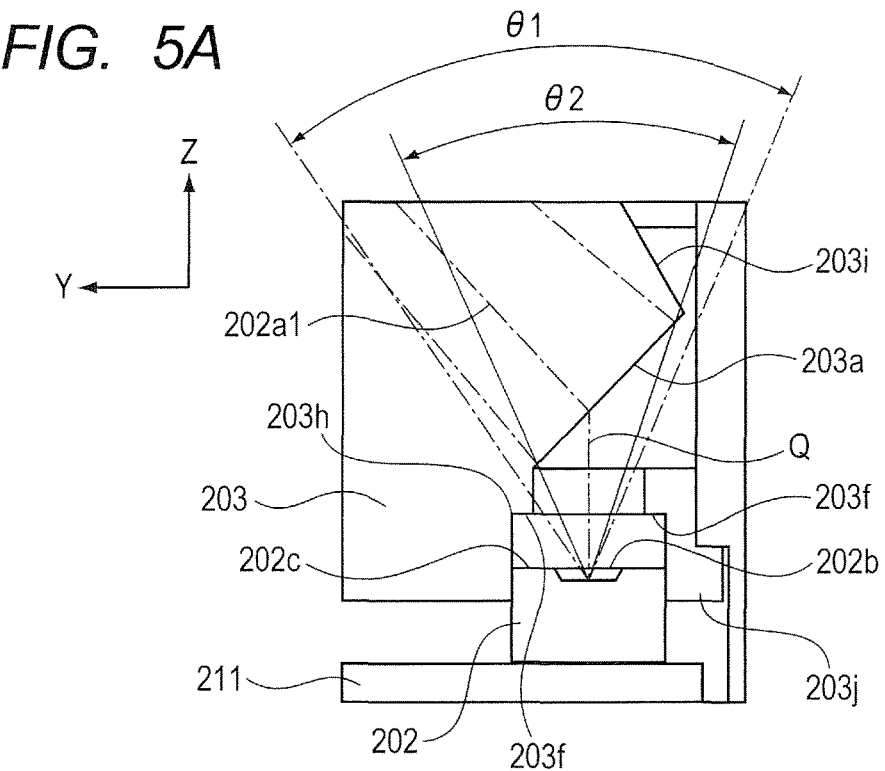
FIG. 5A is an explanatory sectional view for illustrating a state in which the light source inserted into the positioning hole of the optical emitting member is displaced with respect to the optical emitting member in an arrow Z direction in the spectral color measuring apparatus according to the first embodiment of the present invention.
Figure 5B:
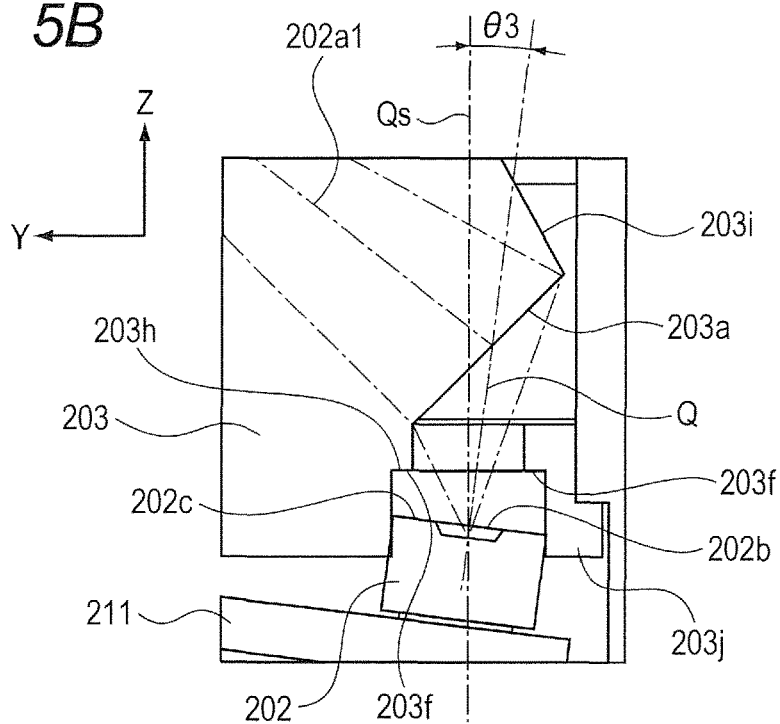
FIG. 5B is an explanatory sectional view for illustrating a state in which the light source inserted into the positioning hole of the optical emitting member is inclined in the spectral color measuring apparatus according to the first embodiment of the present invention.

Next, referring to FIG. 5A and FIG. 5B, positioning failure of the light source 202 is described. FIG. 5A is an explanatory sectional view for illustrating a configuration of the vicinity of the light source 202 when the light source 202 is fitted into the positioning hole 203h under a state in which an upper surface 202c of the light source 202 is not held in contact with the regulating portion 203f being the wall surface of the positioning hole 203h.

In a light intensity distribution of the light source 202 illustrated in FIG. 2, the light intensity is reduced as approaching to the outer side of the radiation angle $\theta 1$ with reference to a direction of the plane normal line Q of the emitting surface 202b of the light source 202. As illustrated in FIG. 5A, the upper surface 202c of the light source 202 is not held in contact with the regulating portion 203f being the wall surface of the positioning hole 203h. Such a case is considered that the light source 202 is fitted into the positioning hole 203h under the state illustrated in FIG. 5A so that the light source 202 is away from the incident surface 203a of the optical emitting element 203 in the direction opposite to the arrow 2 direction illustrated in FIG. 5A (downward direction of FIG. 5A).

In the case illustrated in FIG. 2, the light source 202 is fitted into the positioning hole 203h under a state in which the upper surface 202c of the light source 202 is held in contact with the regulating portion 203f being the wall surface of the positioning hole 203h, and the light flux 202a emitted from the light source 202 is taken in at the radiation angle $\theta 1$ illustrated in FIG. 2. As compared to the case of FIG. 2, in FIG. 5A, the light flux 202a emitted from the light source 202 can be taken in only at a radiation angle $\theta 2$ (<$\theta 1$) smaller than the radiation angle $\theta 1$ illustrated in FIG. 2. As a result, the efficiency of taking in the light flux 202a emitted from the emitting surface 202b of the light source 202 is degraded.

Further, in the case illustrated in FIG. 5B, the upper surface 202c of the light source 202 is not held in contact with the regulating portion 203f being the wall surface of the positioning hole 203h. In addition, the plane normal line Q of the emitting surface 202b of the light source 202 is inclined at an inclination angle $\theta 3$ with respect to a plane normal line Qs corresponding to the plane normal line Q direction of the emitting surface 202b of the light source 202 illustrated in FIG. 2. In this state, the light source 202 is fitted into the positioning hole 203h.

Thus, light having a relatively small radiation angle (light having high light intensity), which is emitted from the emitting surface 202b of the light source 202, is deviated from the incident surface 203a of the optical emitting element 203. As a result, the efficiency of taking in the light flux 202a emitted from the emitting surface 202b of the light source 202 is degraded.

As illustrated in FIG. 5A and FIG. 5B, the position in the arrow Z direction and the direction of the emitting surface 202b of the light source 202 with respect to the incident surface 203a of the optical emitting element 203 illustrated in FIG. 5A and FIG. 5B are deviated from the regular position and direction illustrated in FIG. 2. Thus, the efficiency of taking in light emitted from the emitting surface 202b of the light source 202 is degraded.

<Positioning of Light Source>

Next, referring to FIG. 6A and FIG. 6B, a configuration of positioning the emitting surface 202b of the light source 202 with respect to the incident surface 203a of the optical emitting element 203, and a configuration of an urging unit configured to urge the light source 202 toward the optical emitting element 203 in the emission direction of the light flux 202a are described.

FIG. 6A is an exploded perspective view for illustrating the configuration of the spectral color measuring apparatus 150 of this embodiment. FIG. 6B is an explanatory perspective view of the spectral color measuring apparatus 150 of this embodiment when viewed from a bottom surface side thereof. In this embodiment, as illustrated in FIG. 6A and FIG. 6B, a plate-like urging member 212 serving as an urging unit, which is configured to urge the light source 202 inserted into the positioning hole 203h of the optical emitting element 203, is fixed on a bottom portion of the housing 201.

The urging member 212 serving as the urging unit of this embodiment includes an urging portion 212a formed of an elastic member. The urging portion 212a formed of the elastic member is held on the housing 201 through intermediation of the urging member 212.

As illustrated in FIG. 6A and FIG. 6B, locking holes 201d being through holes are formed in the side plate 201b and a side plate 201c of the housing 201 of this embodiment. Further, locking claws 212b formed on the plate-like urging member 212 formed of the light shielding member are inserted into the locking holes 201d to be locked thereto. With this, the urging member 212 is fixed on the bottom portion of the housing 201.

As illustrated in FIG. 4B, the light source 202 of this embodiment is mounted on the electronic substrate 211 formed of the light shielding member. An electrical cable 17 configured to supply power or signals to the light source 202 is connected to the electronic substrate 211.

Under a state in which the urging member 212 is fixed on the bottom portion of the housing 201 as illustrated in FIG. 6B, as illustrated in FIG. 2, an urging force F of urging the light source 202 in the arrow Z direction illustrated in FIG. 2 is applied by the urging portion 212a of the urging member 212, which is formed of the elastic member, through intermediation of the electronic substrate 211.

With this, the upper surface 202c of the light source 202 is brought into contact with the regulating portion 203f being the wall surface of the positioning hole 203h of the optical emitting element 203. The light source 202 is urged by the urging member 212 serving as the urging unit to be brought into contact with the optical emitting element 203 (optical emitting member) so that the light source 202 is positioned in the emission direction of the light flux 202a. With this, the position and the direction of the light source 202 in the arrow Z direction illustrated in FIG. 2 are accurately regulated. The emitting surface 202b of the light source 202 is positioned with respect to the incident surface 203a of the optical emitting element 203 in the arrow Z direction illustrated in FIG. 2. Along therewith, the deviation of the emitting surface 202b in the plane normal line Q direction is suppressed.

The spectral color measuring apparatus 150 of this embodiment includes the regulating portions 203b to 203f being the wall surfaces of the positioning hole 203h formed in the optical emitting element 203, and the urging member 212 configured to urge the light source 202, which is inserted and fitted into the positioning hole 203h, through intermediation of the electronic substrate 211. With this, the relative positional accuracy between the light source 202 and the optical emitting element 203 serving as the optical emitting member can be enhanced. When the relative positional accuracy between the light source 202 and the optical emitting element 203 is degraded to reduce the intensity of the illumination light, the light amount required for the detection by the light receiving element may not be secured in a predetermined accumulation time period. In order to secure the required light amount, the accumulation time period needs to be increased to secure the required light amount. As a result, a color measuring takt (time period) is increased. However, with such a configuration of this embodiment, it is possible to provide the spectral color measuring apparatus 150 capable of accurately measuring a color of an image in a short color measuring takt (time period).

Further, in order to prevent the degradation of the efficiency of taking in the light flux at the incident surface of the optical emitting element even when the accuracy of the relative position between the light source 202 and the optical emitting element 203 is degraded, it is also conceivable to enlarge the incident surface. When the incident surface is enlarged, the optical emitting element is also enlarged so that the size of the spectral color measuring apparatus is also increased. The increase in size of the spectral color measuring apparatus may become a significant disadvantage when installation space is limited in a case where the spectral color measuring apparatus is used under a state of being accommodated in the image forming apparatus. However, with such a configuration of this embodiment, the optical emitting element 203 serving as the optical emitting member having only a minimum necessary size takes in the light flux 202a emitted from the light source 202 with high efficiency, thereby being capable of securing the amount of light illuminating the color-patch image 210 formed on the surface of the sheet P, which serves as the detected surface.

Second Embodiment

Figure 7:
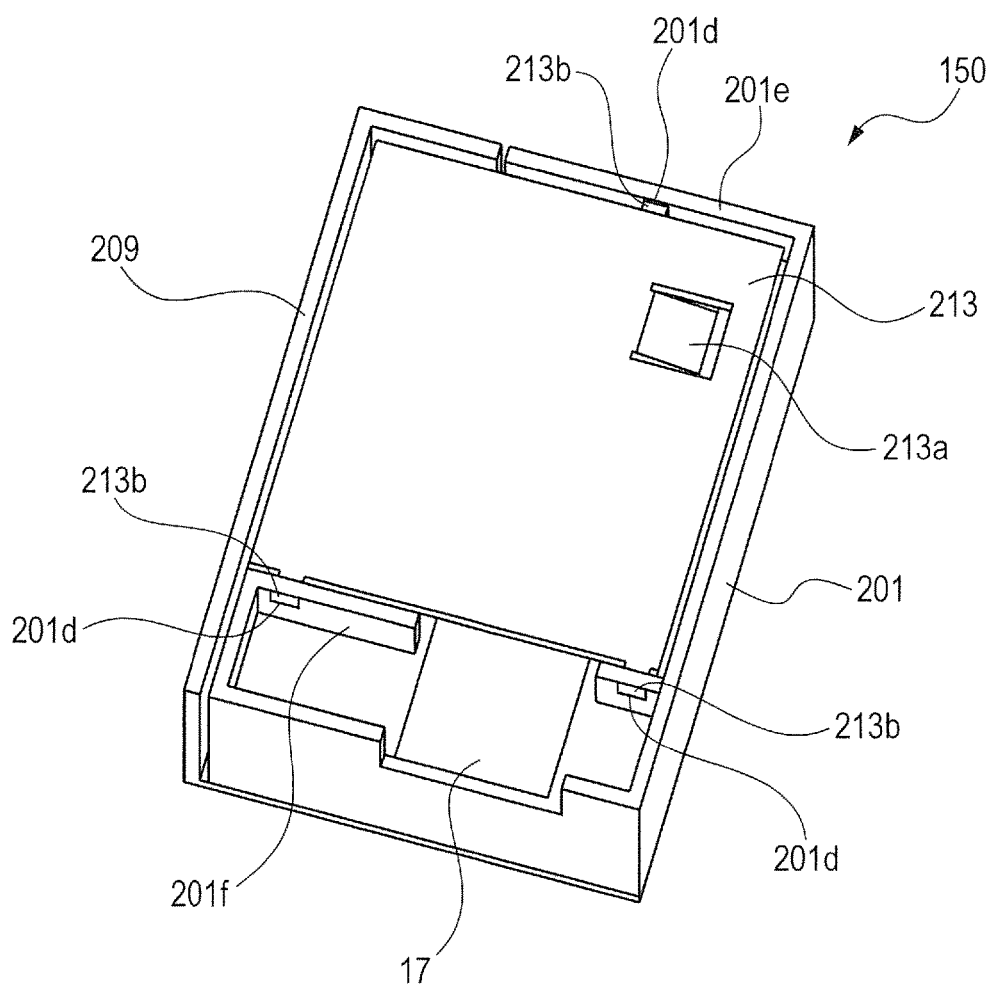
FIG. 7 is a perspective view of a spectral color measuring apparatus having mounted therein an urging unit, which is configured to urge the light source toward the optical emitting member in the emission direction of the light flux, when viewed from a bottom surface side thereof according to a second embodiment of the present invention.

Next, referring to FIG. 7, a configuration of an image forming apparatus including a spectral color measuring apparatus according to a second embodiment of the present invention is described. Note that, components having the same configurations as those of the first embodiment are denoted by the same reference symbols or are denoted by the same names even though different reference symbols are given, and description thereof is herein omitted. FIG. 7 is an explanatory perspective view of the spectral color measuring apparatus 150 of this embodiment when viewed from a bottom surface side thereof.

In the first embodiment illustrated in FIG. 6A and FIG. 6B, the opening window 201a being the through hole is formed in the side plate 201b, on which the light receiving element 207 is mounted, of the housing 201 of the spectral color measuring apparatus 150, which is formed of the light shielding member. An upper portion of an outer side of the side plate 201b, on which the light receiving element 207 is mounted, of the housing 201 is covered by the cover 209 formed of the light shielding member, but a lower portion thereof is exposed. As a result, the ambient light D may enter the light receiving surface 207a of the light receiving element 207 from the outside through the opening window 201a, which may become noise in color measurement.

In order to prevent such a situation, in this embodiment, as illustrated in FIG. 7, the bottom surface of the spectral color measuring apparatus 150 is covered over a substantially entire region including the housing 201 and the cover 209 by a plate-like urging member 213 formed of a light shielding member. The urging member 213 serves as an urging unit configured to urge the light source 202 toward the optical emitting element 203 serving as the optical emitting member in the emission direction of the light flux 202a.

With this, the light receiving element 207 fixed on the outer side of the side plate 201b of the housing 201 is also covered by the cover 209 and the urging member 213 formed of the light shielding member. The light receiving element 207 is configured to receive and detect the detected light flux 14 serving as the light flux dispersed by the optical spectral member 206.

The housing 201 accommodates the light source 202 and the electronic substrate 211 having the light source 202 mounted thereon, which is formed of the light shielding member. The housing 201 further accommodates the optical emitting element 203 serving as the optical emitting member configured to guide the light flux 202a emitted from the light source 202 onto the color-patch image 210 serving as the detected surface, which is fixed on the surface of the sheet P (onto the detected surface).

The housing 201 further accommodates the optical light guiding element 204 serving as the optical light guiding member configured to guide the detected light flux 14 serving as the reflection light reflected by the color-patch image 210, and the optical spectral member 206 configured to disperse the detected light flux 14 serving as the light flux exiting from the optical light guiding element 204 to enter the optical spectral member 206.

The locking holes 201d being the through holes are formed in a side plate 201e and a leg portion 201f of the housing 201. Locking claws 213b formed on the plate-like urging member 213 are inserted into the locking holes 201d to be locked thereto. With this, the urging member 213 is held on the housing 201. The urging member 213 of this embodiment is fixed over the bottom portions of the housing 201 and the cover 209. The plate-like urging member 213 is formed of the light shielding member, and is configured to close an exposed portion of the light receiving element 207.

As illustrated in FIG. 7, the urging member 213 is fixed over the bottom portions of the housing 201 and the cover 209. Further, similarly to the first embodiment illustrated in FIG. 2, the urging force F of urging the light source 202 in the arrow Z direction illustrated in FIG. 2 is applied by an urging portion 213a of the urging member 213, which is formed of an elastic member, through intermediation of the electronic substrate 211.

With this, the upper surface 202c of the light source 202 is brought into contact with the regulating portion 203f being the wall surface of the positioning hole 203h of the optical emitting element 203. Thus, the position in the arrow Z direction and the direction of the light source 202 illustrated in FIG. 2 are accurately regulated. In this manner, the emitting surface 202b of the light source 202 is positioned with respect to the incident surface 203a of the optical emitting element 203 in the arrow Z direction illustrated in FIG. 2. Further, the deviation of the emitting surface 202b in the plane normal line Q direction can be suppressed.

In this embodiment, the plate-like urging member 213 formed of the light shielding member urges, at the urging portion 213a formed of the elastic member, the light source 202, which is inserted, and fitted into the positioning hole 203h of the optical emitting element 203, in the arrow Z direction illustrated in FIG. 2 through intermediation of the electronic substrate 211. Further, as illustrated in FIG. 6B, the entrance of the ambient light D into the light receiving element 207 from the outside can be suppressed. With this, it is possible to attain the spectral color measuring apparatus 150 with less noise in the color measurement, which may be caused due to the entrance of the ambient light D into the light receiving element 207 from the outside. Other components have the same configurations as those of the first embodiment, and the same effects can be obtained.

Third Embodiment

Figure 8A:
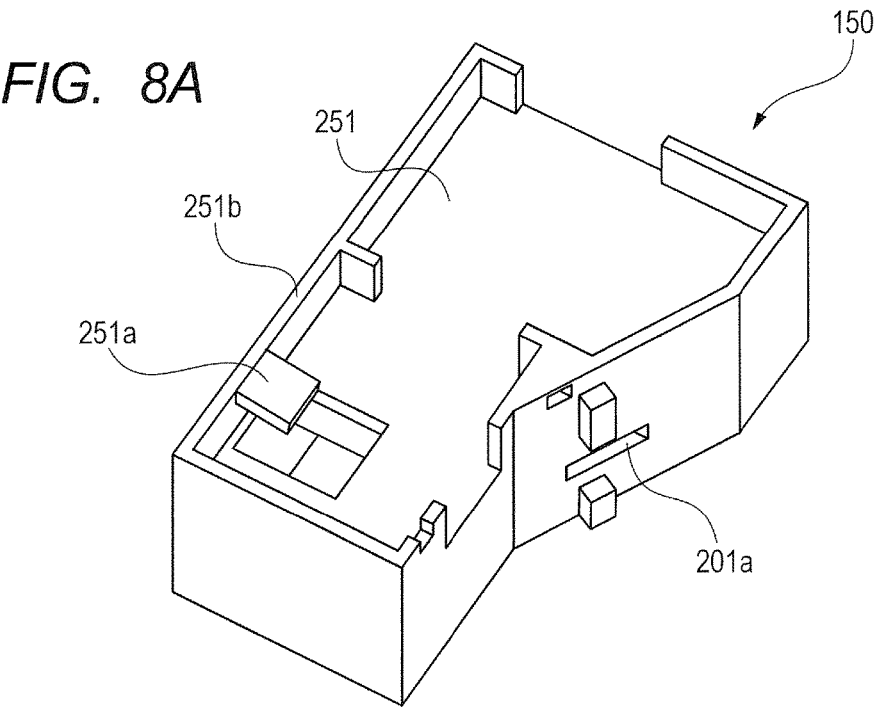
FIG. 8A is a perspective view of a spectral color measuring apparatus including an elastic portion integrally formed on a housing, which serves as an urging unit configured to urge the light source toward the optical emitting member in the emission direction of the light flux, when viewed from a bottom surface side thereof according to a third embodiment of the present invention.
Figure 8B:
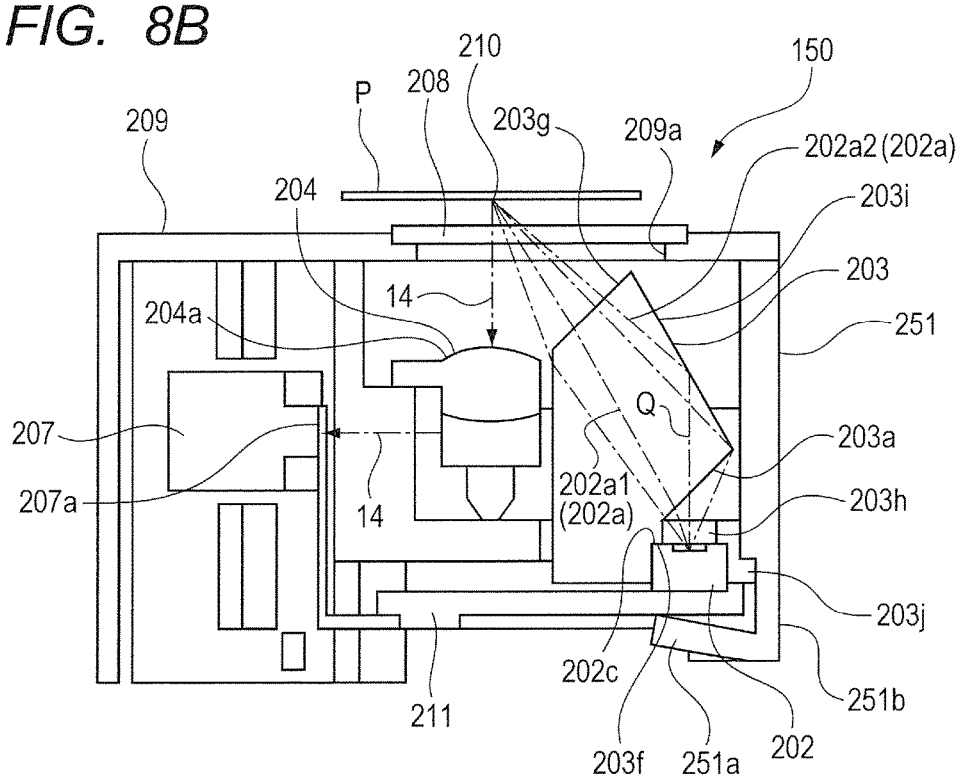
FIG. 8B is an explanatory sectional view for illustrating a configuration of the spectral color measuring apparatus according to the third embodiment of the present invention.

Next, referring to FIG. 8A and FIG. 8B, a configuration of an image forming apparatus including a spectral color measuring apparatus according to a third embodiment of the present invention is described. Note that, components having the same configurations as those of each of the embodiments are denoted by the same reference symbols or are denoted by the same names even though different reference symbols are given, and description thereof is herein omitted. FIG. 8A is an explanatory perspective view of the spectral color measuring apparatus 150 of this embodiment when viewed from a bottom surface side thereof. FIG. 8B is an explanatory sectional view for illustrating a configuration of the spectral color measuring apparatus 150 of this embodiment.

In each of the embodiments, the plate-like urging member 212 or 213 including the urging portion 212a or 213a formed of the elastic member, which is configured to urge the light source 202 in the arrow Z direction illustrated in FIG. 2, is fixed on the bottom surface sides of the housing 201 and the cover 209.

In this embodiment, as illustrated in FIG. 8A and FIG. 8B, there is formed an elastic portion 251a being a cantilever protruding inwardly from a leg portion 251b of a housing 251 formed of a light shielding member. The elastic portion 251a integrally formed on the housing 251 serves as an urging unit configured to urge the light source 202 toward the optical emitting element 203 serving as the optical emitting member in the emission direction of the light flux 202a.

The light source 202, which is inserted and fitted into the positioning hole 203h of the optical emitting element 203 due to an elastic force of the elastic portion 251a, is urged in the arrow Z direction illustrated in FIG. 2 (upward direction in FIG. 8B) through intermediation of the electronic substrate 211 formed of the light shielding member. Other components have the same configurations as those of each of the embodiments, and the same effects can be obtained.

Fourth Embodiment

Figure 9:
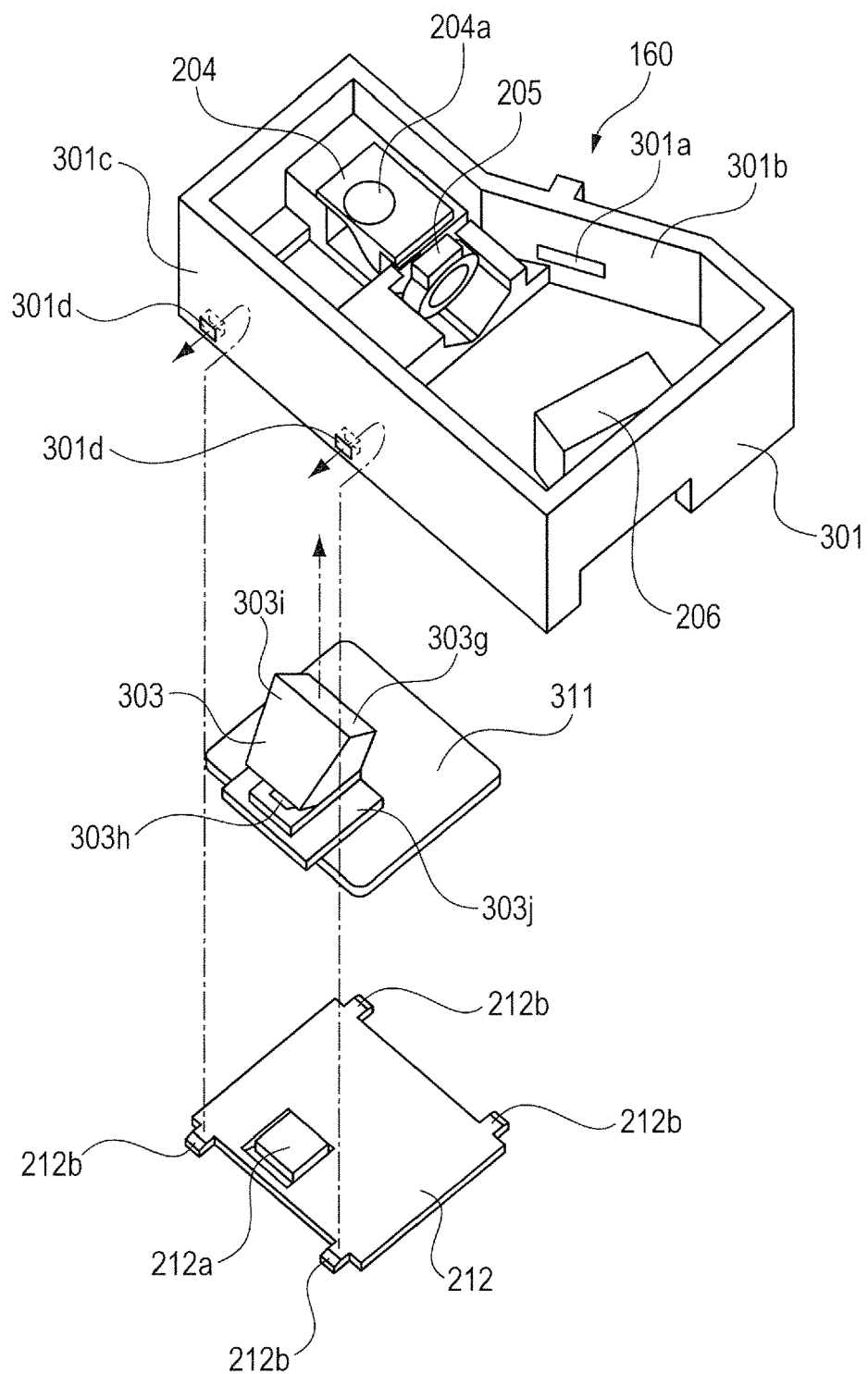
FIG. 9 is an exploded perspective view for illustrating how an optical emitting member, the light source, and the urging unit of a spectral color measuring apparatus are assembled to a housing according to a fourth embodiment of the present invention.

Next, referring to FIG. 9, FIG. 10A, FIG. 10B, and FIG. 10C, a configuration of an image forming apparatus including a spectral color measuring apparatus according to a fourth embodiment of the present invention is described. Note that, components having the same configurations as those of each of the embodiments are denoted by the same reference symbols or are denoted by the same names even though different reference symbols are given, and description thereof is herein omitted. FIG. 9 is an exploded perspective view for illustrating a configuration of a spectral color measuring apparatus 160 of this embodiment.

In this embodiment, the spectral color measuring apparatus 160 illustrated in FIG. 3 includes an optical emitting element 303 serving as an optical emitting member configured to guide the light flux 202a emitted from the light source 202 onto the color-patch image 210 serving as the detected surface, which is formed on the surface of the sheet P (onto the detected surface). The spectral color measuring apparatus 160 further includes an electronic substrate 311 having the light source 202 mounted thereon, which is formed of a light shielding member. The spectral color measuring apparatus 160 further includes a housing 301 formed of a light shielding member, which is configured to accommodate the light source 202, the optical emitting element 303, the optical light guiding element 204 serving as the optical light guiding member, and the optical spectral member 206. Other members have the same shapes and functions as those in each of the embodiments, and hence are denoted by the same reference symbols to omit redundant description herein.

Figure 10A:
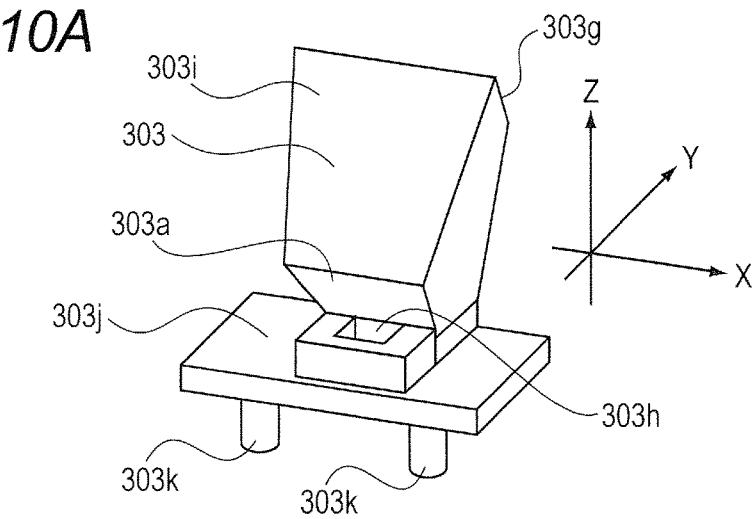
FIG. 10A is a perspective view for illustrating a configuration of the optical emitting member according to the fourth embodiment of the present invention.
Figure 10B:
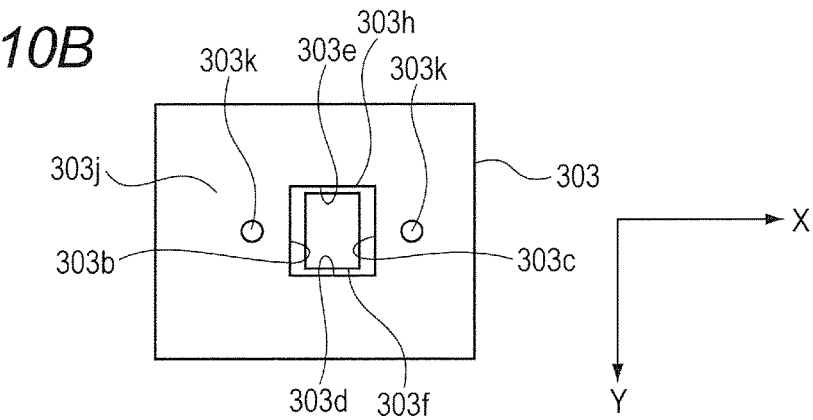
FIG. 10B is a bottom view for illustrating a configuration of regulating portions being wall surfaces of a positioning hole formed in a bottom surface of the optical emitting member according to the fourth embodiment of the present invention.
Figure 10C:
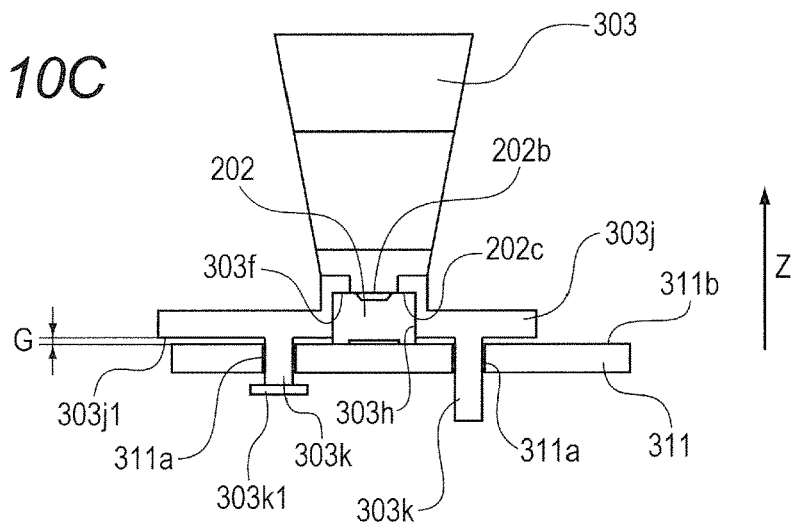
FIG. 10C is an explanatory sectional view for illustrating a state in which the light source and the optical emitting member are positioned to hold an electronic substrate by the optical emitting member according to the fourth embodiment of the present invention.

Next, a configuration of the optical emitting element 303, which is a technical feature of this embodiment, is described. FIG. 10A is an explanatory perspective view for illustrating the configuration of the optical emitting element 303. FIG. 10B is an explanatory view of a bottom surface of the optical emitting element 303, for illustrating a configuration of a rectangular positioning hole 303h formed in the optical emitting element 303, into which the light source 202 is inserted. FIG. 10C is art explanatory sectional view for illustrating a configuration in which the light source 202 is inserted and fitted into the positioning hole 303h formed in the optical emitting element 303.

In each of the embodiments, as illustrated in FIG. 4B, only the light source 202 is fixed on the electronic substrate 211, and the optical emitting element 203 and the electronic substrate 211 are separated from each other. In this embodiment, as illustrated in FIG. 10C, both of the light source 202 and the optical emitting element 303 are fixed on the electronic substrate 311 formed of the light shielding member. The electronic substrate 311 of this embodiment is held on the optical emitting element 303 serving as the optical emitting member.

As illustrated in FIG. 10B, the positioning hole 303h formed in the optical emitting element 303 includes regulating portions 303b and 303c being wall surfaces, which are configured to regulate the movement of the light source 202 in an arrow X direction illustrated in FIG. 10B and a direction opposite thereto. The positioning hole 303h further includes regulating portions 303d and 303e being wall surfaces, which are configured to regulate the movement of the light source 202 in an arrow Y direction illustrated in FIG. 10B and a direction opposite thereto. The positioning hole 303h further includes a regulating portion 303f being a wall surface, which is configured to regulate the movement of the light source 202 in an arrow Z direction illustrated in FIG. 10C.

The positioning hole 303h includes the regulating portions 303b to 303f configured to regulate the position of the light source 202 in the emission direction of the light flux 202a of the light source 202 (arrow Z direction) and the four directions orthogonal to the emission direction of the light flux 202a of the light source 202 (arrow Z direction) (arrow X and Y directions and directions opposite thereto). When the upper surface 202c of the light source 202 is brought into contact with the regulating portion 303f being the wall surface of the positioning hole 303h formed in the optical emitting element 303, the position of the light source 202 is regulated in the emission direction of the light flux 202a by the optical emitting element 303 serving as the optical emitting member.

As illustrated in FIG. 10B and FIG. 10C, also in this embodiment, the side plates of the light source 202 in the four directions are respectively brought into contact with the regulating portions 303b to 303e being the wall surfaces of the positioning hole 303h formed in the optical emitting element 303, to thereby regulate the position of the light source 202. The side plates of the light source 202 in the four directions are respectively located in the arrow X and Y directions illustrated in FIG. 10B and the directions opposite thereto. In the arrow Z direction illustrated in FIG. 10C, the upper surface 202c of the light source 202 is brought into contact with the regulating portion 303f, to thereby regulate the position of the emitting surface 202b only in an upward direction in FIG. 10C.

In this embodiment, as illustrated in FIG. 10C, not only the light source 202 but also the optical emitting element 303 is fixed on the electronic substrate 311. Fixing portions 303k protruding downward are formed on a lower surface of a holder portion 303j having formed therein the positioning hole 303h of the optical emitting element 303.

As illustrated in FIG. 10A and FIG. 10B, the fixing portions 303k each have a straight columnar shape under a state in which the optical emitting element 303 is a single component. As illustrated in FIG. 10C, the light source 202 fixed on the electronic substrate 311 in advance is inserted and fitted into the positioning hole 303h formed in the optical emitting element 303. Further, the columnar fixing portions 303k, which are formed on the holder portion 303j of the optical emitting element 303, are inserted through through holes 311a passing through the electronic substrate 311. Then, as the fixing portion 303k illustrated in the left side of FIG. 10C, distal end portions 303k1 of the fixing portions 303k are subjected to heat staking to fix the optical emitting element 303 to the electronic substrate 311.

Note that, in the optical emitting element 303, even when dimensional accuracy of the light source 202 and the optical emitting element 303 is deviated, the upper surface 202c of the light source 202 and the regulating portion 303f being the wall surface of the positioning hole 303h are reliably held in contact with each other. In order to achieve the configuration, the optical emitting element 303 is fixed to the electronic substrate 311 with a predetermined clearance G between a bottom surface 303j1 of the holder portion 303j and an upper surface 311b of the electronic substrate 311.

Further, as illustrated in the left side in FIG. 10C, the distal end portions 303k1 of the fixing portions 303k of the holder portion 303j of the optical emitting element 303 are subjected to the heat staking to fix the optical emitting element 303 to the electronic substrate 311. Consequently, backlash may considerably be caused in the arrow Z direction illustrated in FIG. 10C. Therefore, as illustrated in FIG. 9, the light source 202 is urged in the arrow Z direction illustrated in FIG. 10C by the urging portion 212a formed of the elastic member, which is formed on the plate-like urging member 212 serving as the urging unit, through intermediation of the electronic substrate 311.

The urging member 212 serving as the urging unit of this embodiment includes the urging portion 212a formed of the elastic member. The urging portion 212a formed of the elastic member is held on the housing 301 through intermediation of the urging member 212.

As illustrated in FIG. 9, locking holes 301a being through holes are formed in side plates 301b and 301c of the housing 301 of this embodiment. Further, the locking claws 212b formed on the plate-like urging member 212 formed of the light shielding member are inserted into the locking holes 301d to be locked thereto. With this, the urging member 212 is fixed on the bottom portion of the housing 301. As illustrated in FIG. 9, an opening window 301a being a through hole for receiving the light receiving surface 207a of the light receiving element 207 is formed in the side plate 301b of the housing 301.

As illustrated in FIG. 10C, the light source 202 of this embodiment is mounted on the electronic substrate 311. The electronic substrate 311 is held by the fixing portions 303k formed on the optical emitting element 303 serving as the optical emitting member.

As illustrated in FIG. 9, the urging member 212 is fixed on the bottom portion of the housing 301. In this state, similarly to the first embodiment illustrated in FIG. 2, the urging force F of urging the light source 202 in the arrow Z direction illustrated in FIG. 10C is applied by the urging portion 212a of the urging member 212, which is formed of the elastic member, through intermediation of the electronic substrate 311.

With this, the upper surface 202c of the light source 202 is brought into contact with the regulating portion 303f being the wall surface of the positioning hole 303h of the optical emitting element 303. Thus, the position in the arrow Z direction and the direction of the light source 202 illustrated in FIG. 10C are accurately regulated. In this manner, the emitting surface 202b of the light source 202 is positioned with respect to an incident surface 303a of the optical emitting element 303 in the arrow Z direction illustrated in FIG. 10C. Further, the deviation of the emitting surface 202b in the plane normal line Q direction is suppressed. Note that, as illustrated in FIG. 9 and FIG. 10A, the optical emitting element 303 includes a total reflection surface 303i and an emitting surface 303g.

In this embodiment, the relative position between the optical emitting element 303 and the light source 202 can easily be confirmed. In the first embodiment illustrated in FIG. 6A, the relative position between the optical emitting element 203 and the light source 202 is visually confirmed under a state in which the optical emitting element 203 and the light source 202 are mounted in the housing 201 formed of the light shielding member. However, the visual confirmation is hindered by various components, thereby causing difficulty in visually confirming the relative position between the optical emitting element 203 and the light source 202.

In this embodiment, as illustrated in FIG. 10C, the electronic substrate 311, the light source 202, and the optical emitting element 303 are mounted in the housing 201. Prior to this, under the state in which the electronic substrate 311, the light source 202, and the optical emitting element 303 are only assembled to each other, the position of the light source 202 with respect to the optical emitting element 303 can be regulated. With this, the relative position between the light source 202 and the optical emitting element 303 can be visually confirmed easily. As a result, failure such as an assembly error is less liable to occur. Other components have the same configurations as those of each of the embodiments, and the same effects can be obtained.

Fifth Embodiment

Figure 11A:
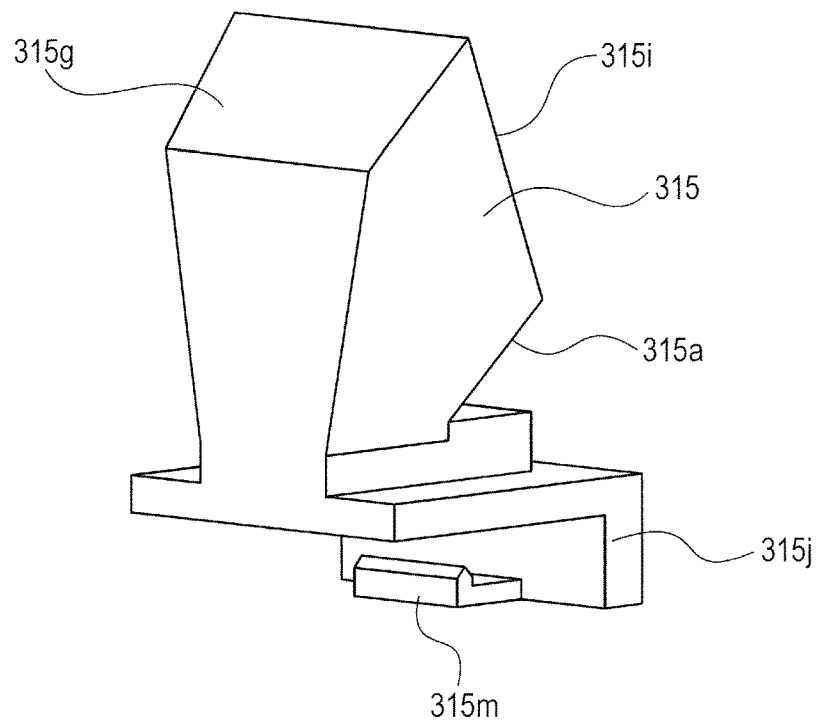
FIG. 11A is a perspective view for illustrating a configuration of an optical emitting member according to a fifth embodiment of the present invention.
Figure 11B:
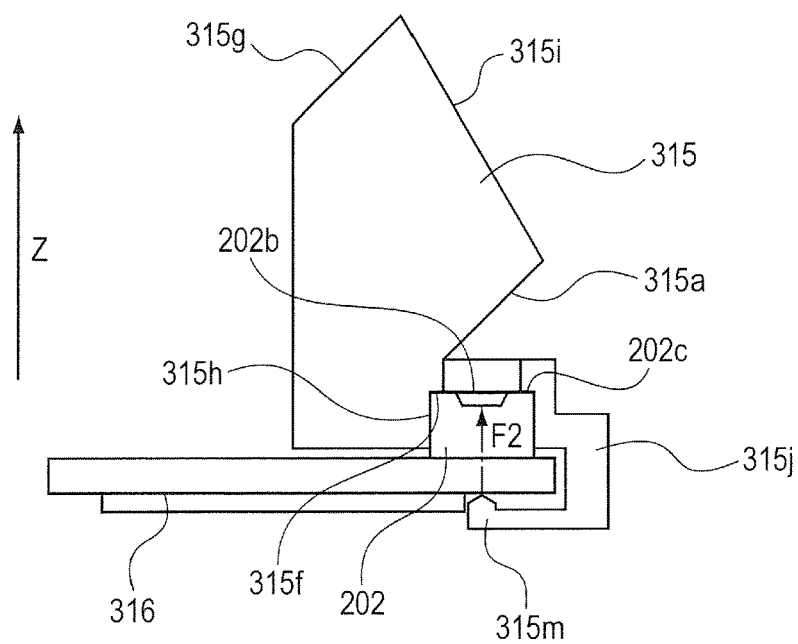
FIG. 11B is an explanatory sectional view for illustrating a state in which the light source and the optical emitting member are positioned to hold an electronic substrate by the optical emitting member according to the fifth embodiment of the present invention.

Next, referring to FIG. 11A, a configuration of an image forming apparatus including a spectral color measuring apparatus according to a fifth embodiment of the present invention is described. Note that, components having the same configurations as those of each of the embodiments are denoted by the same reference symbols or are denoted by the same names even though different reference symbols are given, and description thereof is herein omitted. FIG. 11A is a perspective view for illustrating a configuration of an optical emitting element 315 of this embodiment. FIG. 11B is an explanatory sectional view for illustrating a configuration in which the light source 202 is inserted and fitted into a positioning hole 315h formed in the optical emitting element 315.

In this embodiment, the light flux 202a emitted from the light source 202 illustrated in FIG. 11B is guided by the optical emitting element 315 serving as an optical emitting member onto the color-patch image 210 serving as the detected surface, which is formed on the surface of the sheet P (onto the detected surface). An elastic portion 315m being a cantilever is formed on a holder portion 315j of the optical emitting element 315.

As illustrated in FIG. 11A, the elastic portion 315m formed integrally on the optical emitting element 315 serves as an urging unit configured to urge the light-source 202 toward the optical emitting element 315 in the emission direction of the light flux 202a (arrow Z direction). Due to an elastic force of the elastic portion 315m, an electronic substrate 316 having the light source 202 mounted thereon, which is formed of a light shielding member, is urged by an urging force F2 in the arrow Z direction illustrated in FIG. 11B.

In this embodiment, as illustrated in FIG. 11B, the optical emitting element 315 is fixed to the electronic substrate 316 by the urging force F2 of the elastic portion 315m. Further, the light source 202 inserted and fitted into the rectangular positioning hole 315h formed in the optical emitting element 315, into which the light source 202 having the rectangular outer shape is inserted, is urged in the arrow Z direction illustrated in FIG. 11B.

The position of the light source 202 can be regulated by regulating portions 315b to 315f being the wall surfaces of the positioning hole 315h in the emission direction of the light flux 202a of the light source 202 (arrow Z direction) and the four directions orthogonal to the emission direction of the light flux 202a of the light source 202 (arrow Z direction). The position of the light source 202 is regulated by the optical emitting element 315 in the emission direction of the light flux 202a (arrow Z direction).

In this embodiment, the plate-like urging member 212 as illustrated in FIG. 9 is unnecessary so that the spectral color measuring apparatus of this embodiment can be provided with a simple configuration. Note that, as illustrated in FIG. 11A and FIG. 11B, the optical emitting element 315 includes an incident surface 315a, a total reflection surface 315i, and an emitting surface 315g. Other components have the same configurations as those of each of the embodiments, and the same effects can be obtained.

Sixth Embodiment

Figure 12A:
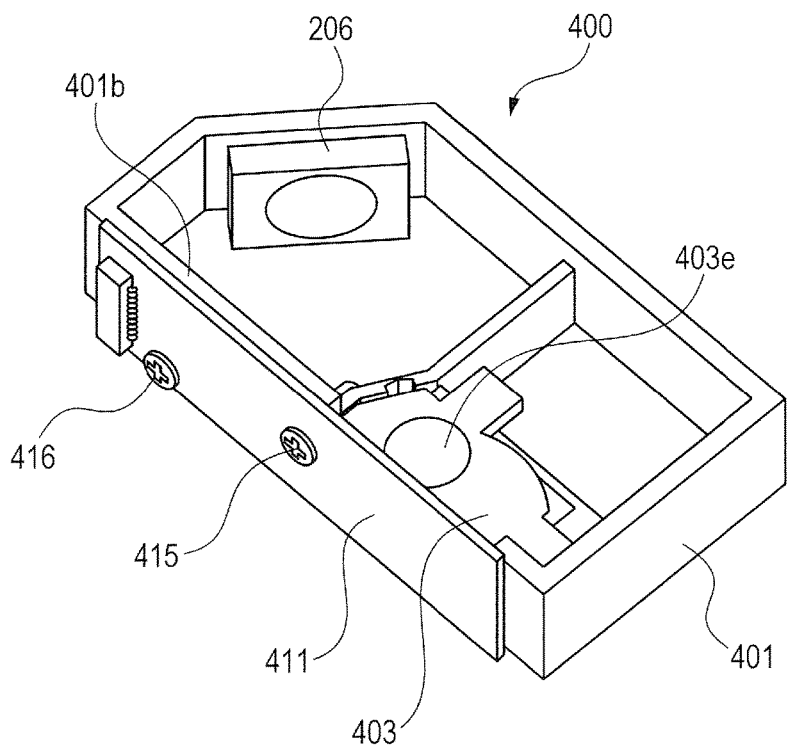
FIG. 12A is a perspective view for illustrating a configuration of a spectral color measuring apparatus according to a sixth embodiment of the present invention.

Next, referring to FIG. 12A to FIG. 16, a configuration of an image forming apparatus including a spectral color measuring apparatus according to a sixth embodiment of the present invention is described. Note that, components having the same configurations as those of each of the embodiments are denoted by the same reference symbols or are denoted by the same names even though different reference symbols are given, and description thereof is herein omitted. FIG. 12A is a perspective view for illustrating a configuration of a spectral color measuring apparatus 400 of this embodiment under a state in which the cover 209 formed of the light shielding member is removed. FIG. 12B is a perspective view for illustrating a configuration of an electronic substrate 411 of this embodiment having the light source 202 and the light receiving element 207 mounted thereon, which is formed of a light shielding member.

Figure 13A:
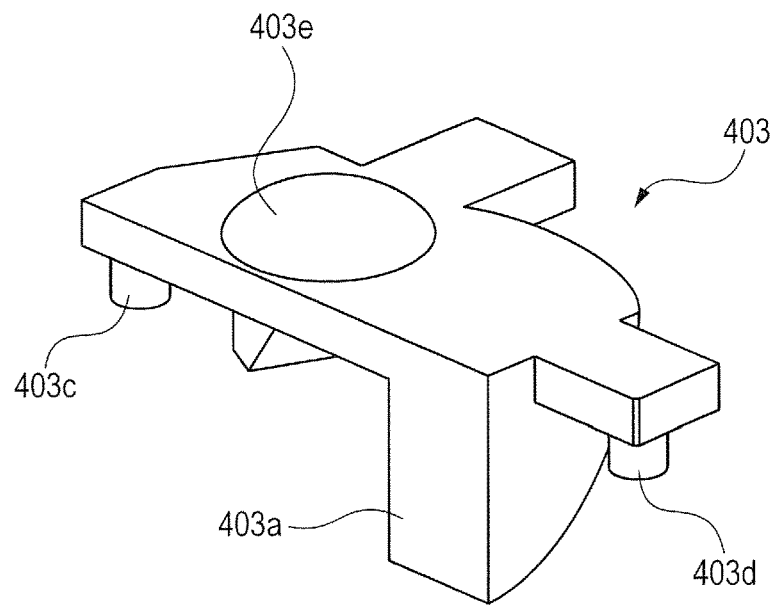
FIG. 13A is a perspective view for illustrating a configuration of a light guiding body having an optical emitting member and an optical light guiding member integrally formed thereon according to the sixth embodiment of the present invention.
Figure 13B:
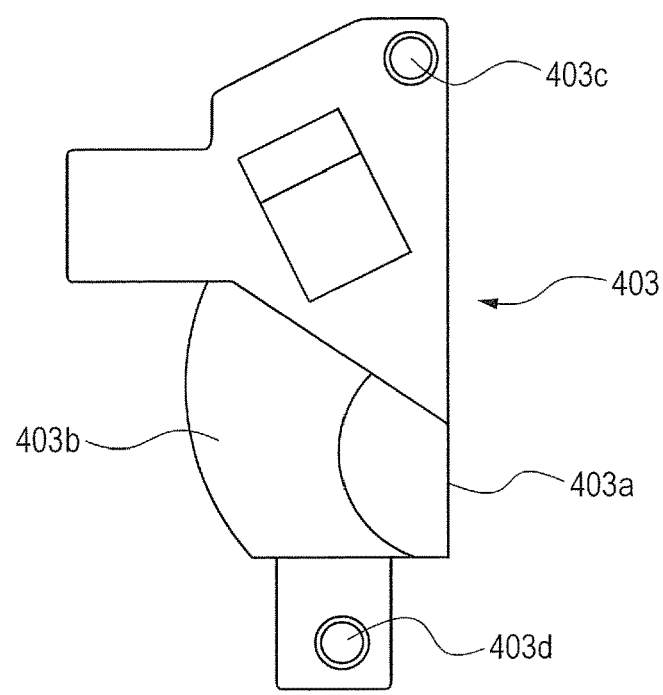
FIG. 13B is a bottom view for illustrating a configuration of the light guiding body having the optical emitting member and the optical light guiding member integrally formed thereon according to the sixth embodiment of the present invention.

FIG. 13A is a perspective view for illustrating a configuration of a light guiding body 403 of this embodiment. The light guiding body 403 has an optical emitting member configured to guide the light flux 202a emitted from the light source 202 onto the color-patch image 210 serving as the detected surface, which is formed on the surface of the sheet P (onto the detected surface). The light guiding body 403 further has formed integrally thereon an optical light guiding member configured to guide the detected light flux 14 serving as the reflection light reflected by the color-patch image 210. FIG. 13B is a bottom view for illustrating a configuration of the light guiding body 403 of this embodiment.

Figure 14:
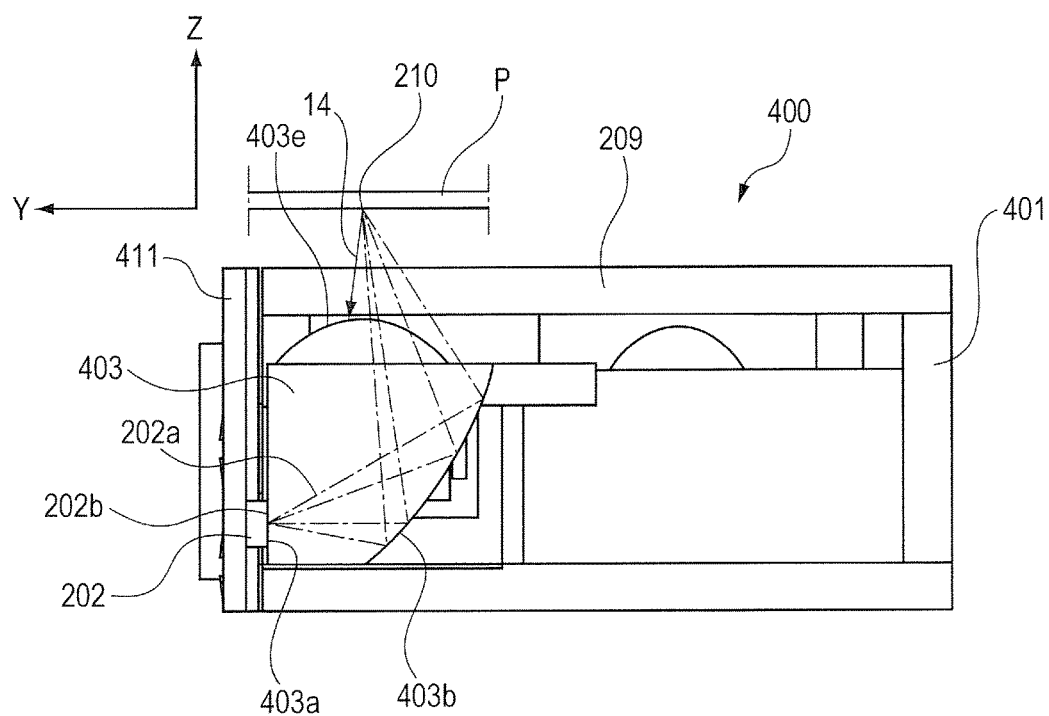
FIG. 14 is an explanatory sectional view for illustrating the spectral color measuring apparatus under a state in which the light flux exiting from the light source to enter the light guiding body is reflected by a reflection surface to enter a detected surface, and further, the detected light flux reflected by the detected surface enters the light guiding body according to the sixth embodiment of the present invention.
Figure 15:
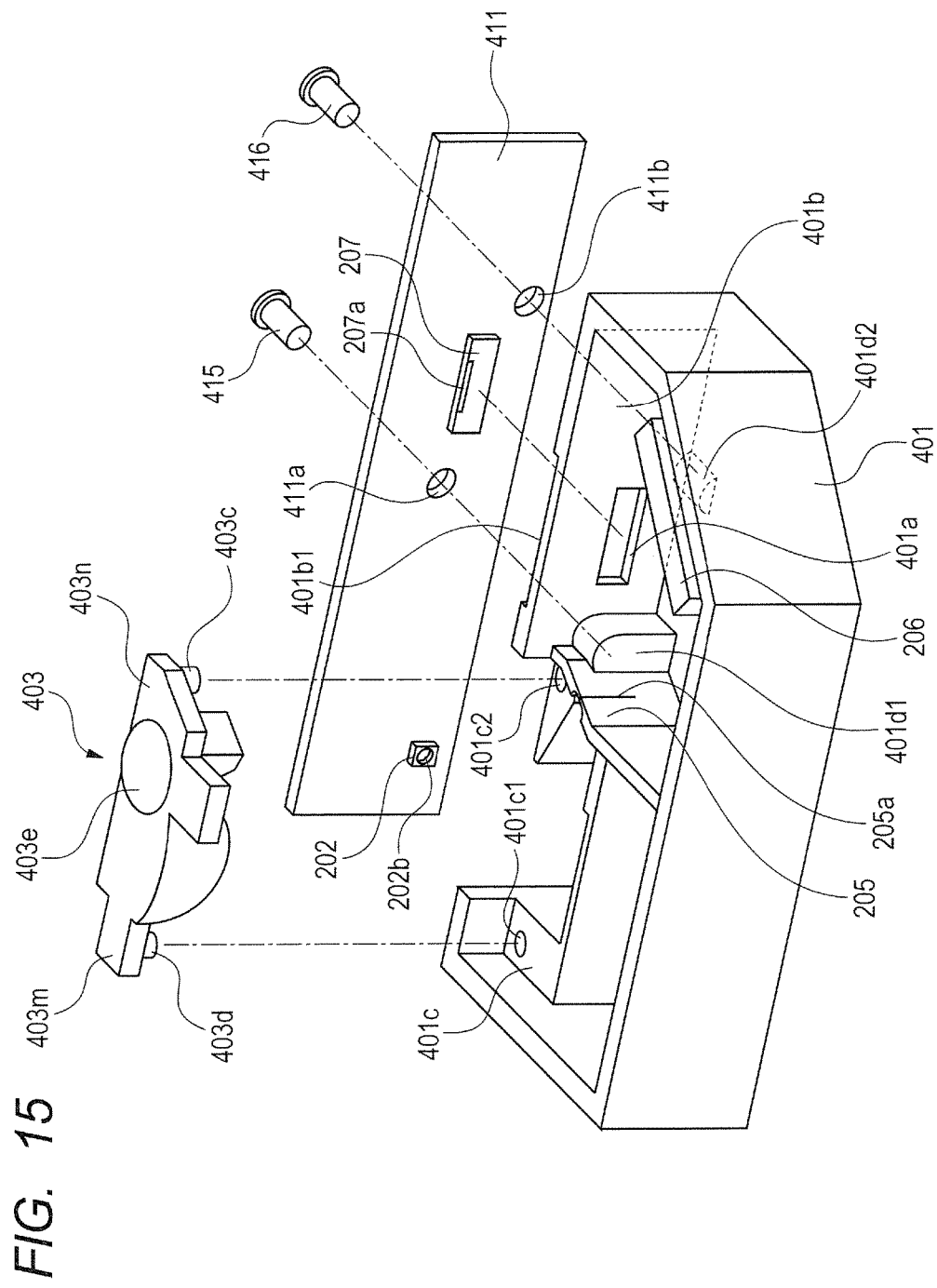
FIG. 15 is an exploded sectional view for illustrating how the light guiding body and the electronic substrate having the light source and the light receiving element mounted thereon are assembled to a housing according to the sixth embodiment of the present invention.
Figure 16:
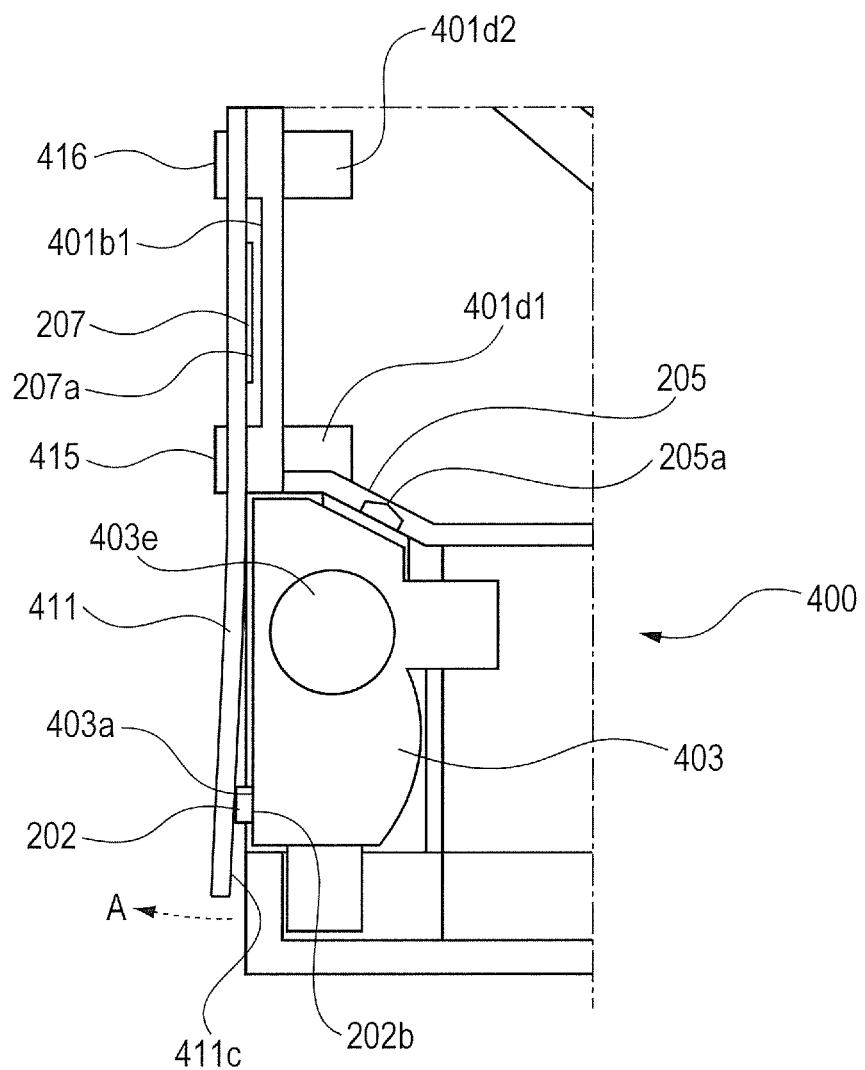
FIG. 16 is an explanatory plan view for illustrating the spectral color measuring apparatus under a state in which the light source is urged toward the light guiding body in the emission direction of the light flux due to a restoring force generated by elastic deformation of the electronic substrate according to the sixth embodiment of the present invention.

FIG. 14 is an explanatory sectional view for illustrating a configuration of the spectral color measuring apparatus 400 of this embodiment. FIG. 15 is an exploded perspective view for illustrating how the spectral color measuring apparatus 400 of this embodiment is assembled. FIG. 16 is a partial plan view for illustrating a configuration of the vicinity of the light guiding body 403 of this embodiment.

Figure 12B:
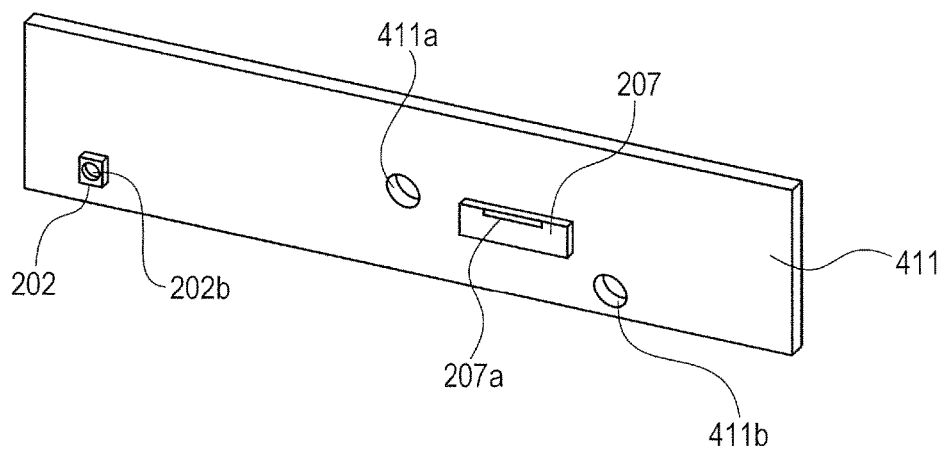
FIG. 12B is a perspective view for illustrating a configuration of an electronic substrate having the light source and the light receiving element mounted thereon according to the sixth embodiment of the present invention.

In this embodiment, as illustrated in FIG. 15, an opening window 401a being a through hole is formed in a side plate 401b of a housing 401 formed of a light shielding member. Further, as illustrated in FIG. 12B and FIG. 15, the light source 202 and the light receiving element 207 are mounted on the electronic substrate 411. Still further, in this embodiment, as illustrated in FIG. 13A, FIG. 13B, and FIG. 14, the light guiding body 403 having the optical emitting member and the optical light guiding member integrally formed thereon is provided.

The light receiving element 207 is configured to receive and detect the detected light flux 14 serving as the light flux dispersed by the optical spectral member 206 configured to disperse the detected light flux 14 serving as the light flux exiting from the optical light guiding member of the light guiding body 403 to enter the optical spectral member 206. With this, the number of components of the spectral color measuring apparatus 400 as a whole can be reduced to attain cost reduction and realize simplification of assembly steps.

<Optical Path>

Next, referring to FIG. 14, an optical path of the spectral color measuring apparatus 400 of this embodiment is described. As illustrated in FIG. 14, the electronic substrate 411 is assembled to the side plate 401b of the housing 401 accommodating the light source 202, the light guiding body 403, and the optical spectral member 206. Therefore, as illustrated in FIG. 14, the light flux 202a emitted from the emitting surface 202b of the light source 202 mounted on the electronic substrate 411 is emitted in a direction opposite to an arrow Y direction illustrated in FIG. 14 (right direction in FIG. 14), which corresponds to a side surface direction of the housing 401.

Then, the light flux 202a enters the incident surface 403a of the light guiding body 403 illustrated in FIG. 13A, FIG. 13B, and FIG. 14 to pass through the light guiding body 403. Then, the light flux 202a is reflected by a reflection surface 403b illustrated in FIG. 13B and FIG. 14 toward the upper side in FIG. 14 to be radiated onto the color-patch image 210 serving as the detected surface, which is formed on the surface of the sheet P.

Further, the detected light flux 14 reflected by the color-patch image 210 again enters an anamorphic surface 403e having a function of converging light in the direction parallel to the light-dispersing direction of the light guiding body 403 so that the light flux 14 is guided through the light guiding body 403. Then, the light flux 14 passes through the slit 205a of the slit member 205 and the optical spectral member 206 illustrated in FIG. 15 to be received by the light receiving surface 207a of the light receiving element 207 mounted on the electronic substrate 411 through the opening window 401a formed in the side plate 401b of the housing 401.

<Assembly Procedure>

Next, referring to FIG. 15, a procedure of assembling the light guiding body 403 and the electronic substrate 411 to the housing 401 is described. As illustrated in FIG. 15, first, the light guiding body 403 is positioned and fixed on a support portion 401c formed on the housing 401. Pin-like projecting portions 403c and 403d are formed on lower surfaces of fixing portions 403n and 403m of the light guiding body 403. The projecting portions 403c and 403d formed on the lower surfaces of the fixing portions 403n and 403m of the light guiding body 403 are inserted and fitted into holes 401c1 and 401c2 formed in the support portion 401c of the housing 401 so that the light guiding body 403 is positioned with respect to the housing 401. Then, the projecting portions 403c and 403d are bonded and fixed at the positions.

The light guiding body 403 of this embodiment includes the optical emitting member portion and the optical light guiding member portion integrally formed thereon. The displacement of the light guiding body 403 leads to displacement with respect to the color-patch image 210 serving as the detected surface illustrated in FIG. 14, which is formed on the surface of the sheet P. Therefore, it is important to suppress the displacement of the light guiding body 403.

Then, as illustrated in FIG. 15, the electronic substrate 411 having the light source 202 and the light receiving element 207 mounted thereon in advance is mounted on an outer side of the side plate 401b of the housing 401. Screws 415 and 416 serving as fixing members are inserted through through holes 411a and 411b of the electronic substrate 411, which are formed in the vicinity of the light receiving element 207, and are threadingly fastened into screw holes (not shown) formed in fixing portions 401d1 and 101d2 formed on the housing 401. With this, the electronic substrate 411 is fixed on the outer side of the side plate 401b of the housing 401.

At this time, as illustrated in FIG. 16, the electronic substrate 411 is elastically deformed to be deflected in an arrow A direction indicated by the broken line in FIG. 16. With this, the light source 202 mounted on a back surface 411c of the electronic substrate 411 so as to protrude therefrom is urged toward the incident surface 403a of the light guiding body 403 due to a restoring force (elastic force) of the electronic substrate 411 so that the light source 202 is brought into contact with the incident surface 403a.

Due to the restoring force generated by the elastic deformation of the electronic substrate 411 serving as an urging unit, which is formed of an elastic member, the light source 202 is urged toward the optical emitting member portion of the light guiding body 403 in the emission direction of the light flux 202a (right direction in FIG. 16). The electronic substrate 411 serving as the urging unit is formed as the elastic member to be held on the housing 401.

With this, the position of the light source 202 is regulated by the optical emitting member portion of the light guiding body 403 in the emission direction of the light flux 202a (right direction in FIG. 16). Thus, the position of the light source 202 in the emission direction of the light flux 202a emitted from the emitting surface 202b (direction opposite to the arrow Y direction in FIG. 14) can be regulated with high accuracy.

Further, it is necessary to suppress the relative displacement between the light receiving element 207 and the optical spectral member 206 as well as suppress the relative displacement between the light source 202 and the light guiding body 403. Therefore, in this embodiment, as illustrated in FIG. 15, the positions of the screws 415 and 416 for fixing the electronic substrate 411 onto the outer side of the side plate 401b of the housing 401 are set in the vicinity of the light receiving element 207.

With this, the deflection of the electronic substrate 411 illustrated in FIG. 16 in the arrow A direction indicated by the broken line in FIG. 16 is suppressed by the screw 415 fixing the electronic substrate 411, thereby preventing the deflection of the electronic substrate 411 in the vicinity of the light receiving element 207 in the arrow A direction. In this manner, the relative position between the optical spectral member 206 and the light receiving element 207 is maintained.

Note that, the light receiving element 207 protruding from the back surface 411c side of the electronic substrate 411 serving as the light shielding member, which is formed of the elastic member, is received in a recessed portion 401b1 formed in a surface of the side plate 401b of the housing 401. Further, the light receiving surface 207a of the light receiving element 207 is received in the opening window 401a formed to pass through the side plate 401b of the housing 401. An exposed portion of the light receiving element 207 is closed by the electronic substrate 411.

In each of the embodiments, the light source 202 is constantly pressed toward the optical emitting element 203, 303, or 315 side by the urging portion 212a or 213a or the elastic portion 251a or 315m through intermediation of the electronic substrate 211, 311, or 316. Therefore, a load is constantly applied to the electronic substrate 211, 311, or 316, the light source 202, and the optical emitting element 203, 303, or 315.

In this embodiment, due to the restoring force of the electronic substrate 411 deflected to be elastically deformed, the light source 202 fixed so as to protrude from the back surface 411c of the electronic substrate 411 is pressed (urged) toward the light guiding body 403 so that the load is constantly applied to the light source 202. With this, the light source 202 is positioned in the emission direction of the light flux 202a. Note that, as illustrated in FIG. 15, the projecting portions 403c and 403d formed on the lower surfaces of the fixing portions 403n and 403m of the light guiding body 403 are inserted and fitted into the holes 401c1 and 401c2 formed in the support portion 401c of the housing 401 so as to be bonded and fixed thereat. Therefore, the light guiding body 403 can bear the load generated by the restoring force of the elastically deformed electronic substrate 411, which is transmitted through the light source 202.

Note that, in this embodiment, due to the restoring force of the deflected electronic substrate 411, the emitting surface 202b of the light source 202 is only positioned in the emission direction of the light flux 202a (arrow Y direction in FIG. 14 and the direction opposite thereto).

Besides, similarly to each of the embodiments, a rectangular positioning hole is formed at a position of the light guiding body 403, which is opposed to the light source 202. The rectangular light source 202 is inserted and fitted into the positioning hole. Further, the position of the light source 202 may be regulated by the regulating portions being the wall surfaces of the positioning hole in the emission direction of the light flux 202a of the light source 202 (arrow Y direction in FIG. 14 and the direction opposite thereto) and the four directions orthogonal thereto. Other components have the same configurations as those of the first embodiment, and the same effects can be obtained.

Note that, in each of the embodiments, the example of the case where the present invention is applied to the image forming apparatus configured to form the color image using the electrophotographic method was described. However, the present invention may also be applied to an image forming apparatus configured to form a color image using an ink jet method or the like.

The degradation of accuracy of the relative position between the light source and the optical emitting member is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-003901, filed Jan. 13, 2015, and Japanese Patent Application No. 2015-218057, filed Nov. 6, 2015, which are hereby incorporated by reference herein in their entirety.

What is claimed is:

1. A color measuring apparatus, comprising:
   an LED light source;
   an electronic substrate on which the LED light source is mounted;
   a first optical guiding member configured to guide a light flux emitted from the LED light source by refracting the light flux emitted from the LED light source and directing the light flux to a detected surface;
   a second optical guiding member configured to guide reflection light reflected by the detected surface by refracting the reflection light reflected by the detected surface;
   an optical spectral member configured to disperse the light flux exiting from the second optical guiding member to enter the optical spectral member;
   a light receiving element configured to receive the light flux dispersed by the optical spectral member;
   a housing configured to accommodate the first optical guiding member, the second optical guiding member, and the optical spectral member; and
   an urging member configured to provide an urging force to the LED light source to urge the LED light source toward the first optical guiding member,
   wherein the LED light source is configured to be urged by the urging member to be brought into contact with the first optical guiding member so that the LED light source is positioned relative to the first optical guiding member.

2. A color measuring apparatus according to claim 1, further comprising regulating portions configured to regulate a position of the LED light source in an emission direction of the light flux of the LED light source and four directions orthogonal to the emission direction of the light flux of the LED light source.

3. A color measuring apparatus according to claim 2, wherein the LED light source has a rectangular outer shape, and wherein the regulating portions comprise wall surfaces of a rectangular positioning hole which is formed in the first optical guiding member and into which the LED light source is inserted.

4. A color measuring apparatus according to claim 1, wherein the optical emitting member and the optical light guiding member are formed integrally with each other.

5. A color measuring apparatus according to claim 1, wherein the urging member comprises an elastic member configured to be held on the housing.

6. A color measuring apparatus according to claim 5, wherein the elastic member comprises a light shielding member configured to close an exposed portion of the light receiving element.

7. A color measuring apparatus according to claim 1, wherein the electronic substrate is held on the optical emitting member.

8. A color measuring apparatus according to claim 1, wherein the urging member comprises an elastic portion integrally formed on the optical emitting member.

9. A color measuring apparatus according to claim 1, wherein the urging member comprises an elastic portion integrally formed on the housing.

10. A color measuring apparatus according to claim 1, wherein the urging member is configured to urge the LED light source toward the first optical guiding member in an emission direction of the light flux due to a restoring force generated by elastic deformation of the electronic substrate.

11. An image forming apparatus, comprising:
    a color measuring apparatus including:
       an LED light source;
       an electronic substrate on which the LED light source is mounted;
       a first optical guiding member configured to guide a light flux emitted from the LED light source by refracting the light flux emitted from the LED light source and directing the light flux to a detected surface;
       a second optical guiding member configured to guide reflection light reflected by the detected surface by refracting the reflection light reflected by the detected surface;
       an optical spectral member configured to disperse the light flux exiting from the second optical guiding member to enter the optical spectral member;
       a light receiving element configured to receive and detect the light flux dispersed by the optical spectral member;
       a housing configured to accommodate the first optical guiding member, the second optical guiding member, and the optical spectral member; and
       an urging member configured to provide an urging force to the LED light source to urge the LED light source toward the first optical guiding member; and an image forming portion configured to form an image on a recording material,
wherein the image forming apparatus is configured to measure, by the color measuring apparatus, a color of an image formed on the recording material by the image forming portion as the detected surface, and
wherein the LED light source is configured to be urged by the urging member to be brought into contact with the first optical guiding member so that the LED light source is positioned relative to the first optical guiding member.

12. A color measuring apparatus, comprising:
an LED light source;
an electronic substrate on which the LED light source is mounted;
an optical guiding member configured to guide a light flux emitted from the LED light source by refracting the light flux emitted from the LED light source and directing the light flux to a detected surface; and
a light receiving element configured to receive the light flux reflected by the detected surface,
wherein the electronic substrate provides an urging force to the LED light source to urge the LED light source toward the optical guiding member, the urging force being a restoring force caused by elastic deformation of the electronic substrate, and
wherein the LED light source is configured to be urged by the electronic substrate to be brought into contact with the optical guiding member so that the LED light source is positioned relative to the optical guiding member.

13. A color measuring apparatus according to claim 12, further comprising:
a second optical guiding member configured to guide reflection light reflected by the detected surface;
an optical spectral member configured to disperse the light flux exiting from the second optical guiding member to enter the optical spectral member; and
a housing configured to accommodate the optical guiding member, the second optical guiding member, and the optical spectral member.

14. A color measuring apparatus according to claim 13, wherein the optical emitting member and the optical light guiding member are formed integrally with each other.

15. A color measuring apparatus according to claim 12, further comprising regulating portions configured to regulate a position of the LED light source in the emission direction of the light flux of the LED light source and four directions orthogonal to the emission direction of the light flux of the LED light source.

16. A color measuring apparatus according to claim 15, wherein the LED light source has a rectangular outer shape, and
wherein the regulating portions comprise wall surfaces of a rectangular positioning hole which is formed in the optical emitting member and into which the LED light source is inserted.

17. A color measuring apparatus according to claim 12, wherein the electronic substrate is configured to be held on the optical emitting member.

18. An image forming apparatus, comprising:
a color measuring apparatus comprising:
an LED light source;
an electronic substrate on which the LED light source is mounted;
an optical emitting member configured to guide a light flux emitted from the LED light source by refracting the light flux emitted from the LED light source and directing the light flux to a detected surface; and
a light receiving element configured to receive the light flux reflected by the detected surface; and
an image forming portion configured to form an image on a recording material,
wherein the image forming apparatus is configured to measure, by the color measuring apparatus, a color of an image formed on the recording material by the image forming portion as the detected surface,
wherein the electronic substrate provides an urging force to the LED light source to urge the LED light source toward the optical guiding member, the urging force being a restoring force caused by elastic deformation of the electronic substrate, and
wherein the LED light source is configured to be urged by the electronic substrate to be brought into contact with the optical guiding member so that the LED light source is positioned relative to the optical guiding member.

* * * * *